United States Patent
Seki

(10) Patent No.: US 8,640,852 B2
(45) Date of Patent: Feb. 4, 2014

(54) SPRING FEEDER

(75) Inventor: Tadayoshi Seki, Chiba-ken (JP)

(73) Assignee: Kanto Electronics Corporation, Chosei-Gun, Chiba-Ken (JP)

( * ) Notice: Subject to any disclaimer, the term of this patent is extended or adjusted under 35 U.S.C. 154(b) by 505 days.

(21) Appl. No.: 12/656,356

(22) Filed: Jan. 27, 2010

(65) Prior Publication Data

US 2010/0187166 A1   Jul. 29, 2010

(30) Foreign Application Priority Data

Jan. 29, 2009 (JP) .................................. 2009-017693

(51) Int. Cl.
*B65G 29/00* (2006.01)
*B65G 47/14* (2006.01)

(52) U.S. Cl.
CPC .................................. *B65G 47/1457* (2013.01)
USPC ............ 198/392; 198/391; 198/380; 198/757

(58) Field of Classification Search
USPC ........................... 198/380, 392, 391, 756, 757
See application file for complete search history.

(56) References Cited

U.S. PATENT DOCUMENTS

| | | | | |
|---|---|---|---|---|
| 3,150,762 A * | 9/1964 | Tricinci | ......................... | 198/380 |
| 3,970,214 A * | 7/1976 | Thimot | ............................. | 221/1 |
| 4,014,429 A * | 3/1977 | Walle | ............................. | 198/396 |
| 4,093,062 A * | 6/1978 | Sjogren | ......................... | 198/380 |
| 4,576,286 A * | 3/1986 | Buckley et al. | ............... | 209/558 |
| 5,083,654 A * | 1/1992 | Nakajima et al. | ............. | 198/444 |
| 5,630,497 A * | 5/1997 | Graham | ......................... | 198/391 |
| 5,826,698 A * | 10/1998 | Sawada | ............................. | 198/443 |
| 5,913,428 A * | 6/1999 | Graham | ......................... | 209/676 |
| 5,960,929 A * | 10/1999 | Graham | ......................... | 198/391 |
| 6,047,810 A * | 4/2000 | Graham | ......................... | 198/391 |
| 6,129,200 A * | 10/2000 | Graham | ......................... | 198/380 |
| 6,161,675 A * | 12/2000 | Graham | ......................... | 198/391 |
| 6,257,392 B1 * | 7/2001 | Graham | ......................... | 198/396 |
| 6,450,320 B1 * | 9/2002 | Turek | ............................. | 198/380 |
| 7,036,652 B2 * | 5/2006 | Hayata et al. | ................. | 198/391 |
| 7,789,215 B1 * | 9/2010 | Snyder | ........................... | 198/391 |

FOREIGN PATENT DOCUMENTS

JP    3386401    1/2003

* cited by examiner

*Primary Examiner* — William R Harp
(74) *Attorney, Agent, or Firm* — McGinn IP Law Group, PLLC

(57) ABSTRACT

A spring feeder including a conveying path and a conveying portion including a conveying groove, the conveying groove having a width approximately equal to a width of the springs. The conveying path for feeding includes a first sorting and conveying portion and a second sorting and conveying portion, the first sorting and conveying portion, the second sorting and conveying portion, and the conveying portion for connection are linked consecutively from the container side. A width of the conveying groove of the second sorting and conveying portion is narrower than a width of the conveying groove of the first sorting and conveying portion and the width of the conveying groove of the second sorting and conveying portion is narrow enough to allow only one spring to be loaded in the conveying direction in the conveying groove of the second sorting and conveying portion.

17 Claims, 16 Drawing Sheets portion (a)

Fig.2A
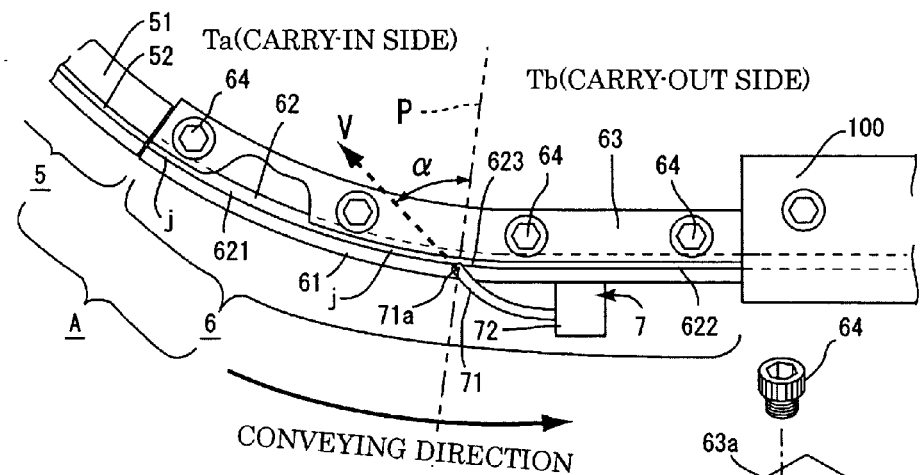
Fig.2B
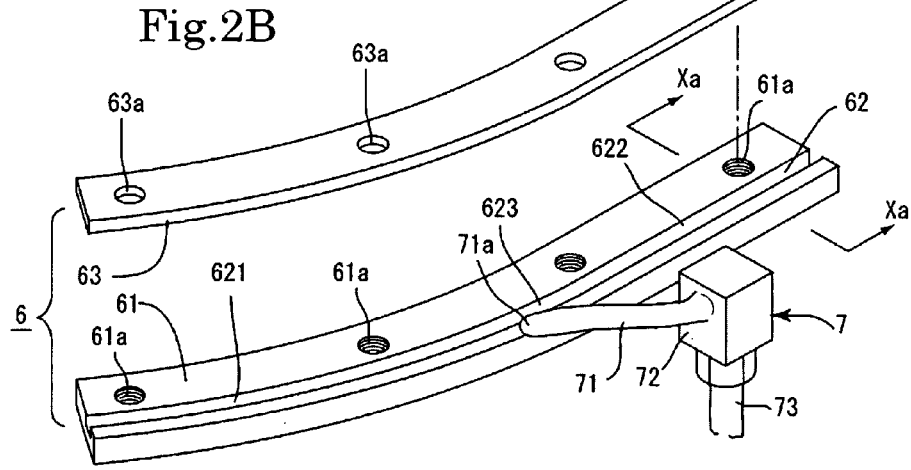
Fig.2C
Fig.2D
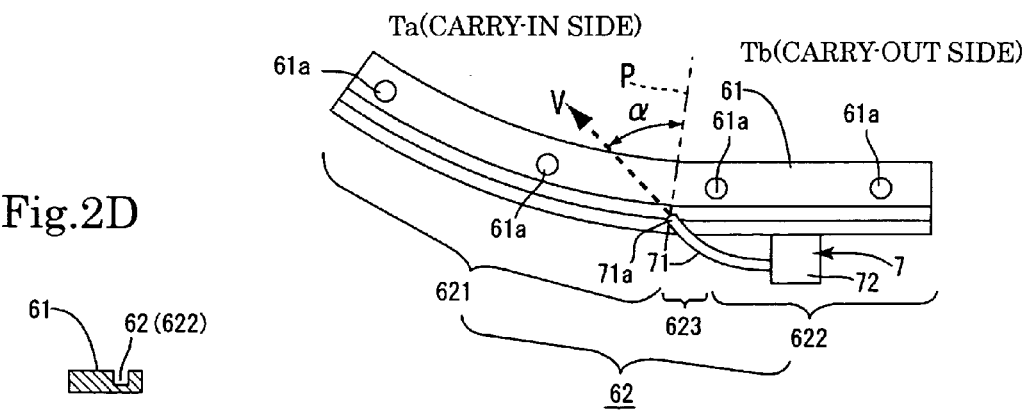

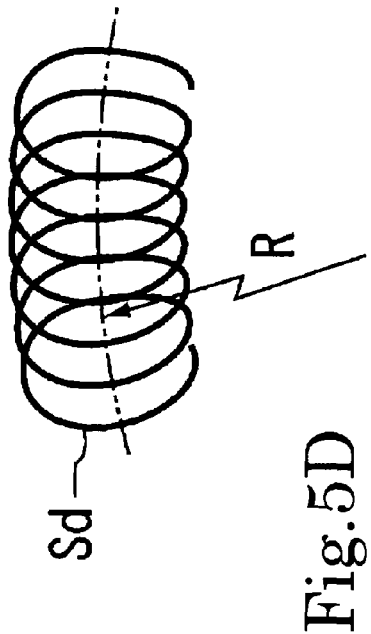
Fig.5B  DEFECTIVE SMALL SPRING (FIRST TYPE)
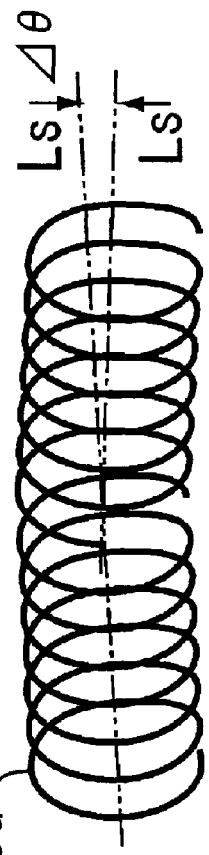
Fig.5D  DEFECTIVE SMALL SPRING (THIRD TYPE)
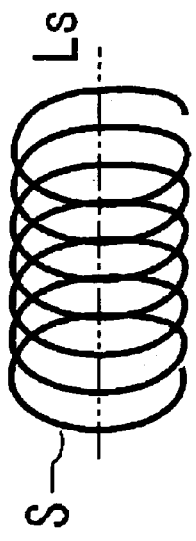
Fig.5A  NORMAL SMALL SPRING
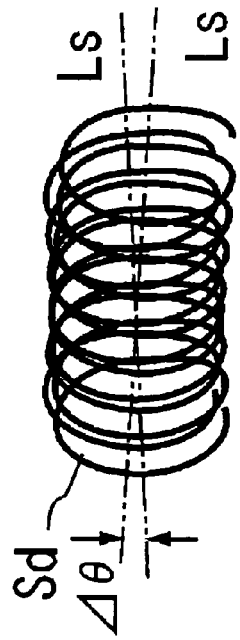
Fig.5C  DEFECTIVE SMALL SPRING (SECOND TYPE)

CONVEYING DIRECTION

SPRING FEEDER

BACKGROUND OF THE INVENTION

1. Field of the Invention

The present invention relates to a spring feeder for arranging coil-type springs (in particular, springs of a very small size) in a row along the compression-elongation direction thereof and feeding the springs in a state suitable for an operation to an operator, whereby spring jamming caused by a defective spring in a conveying path for feeding of the feeder can be released.

2. Description of the Related Art

Spring feeders are known that serve to arrange a large number of coil-type springs in a row along the compression-elongation direction thereof and feed the springs one by one in a state suitable for an operation to an operator. In such a spring feeder, a large number of springs are loaded into a container that is subjected to vibrations by a vibrator, the large number of springs are moved inside the container, while being arranged in a row by vibrations, and the springs are fed one by one to the operator via a conveying path for feeding.

However, among the large number of springs loaded into the container, two or more springs can be tangled. Accordingly, there are spring feeders equipped with a means for separating a plurality of tangled springs into individual springs. Further, among the types of springs that are handled by the spring feeders, there are springs of a very small size. Such miniature springs can be easily tangled, or deformed and damaged and are therefore very difficult to handle. The tangled miniature springs are difficult to detangle, and when they are separated, the miniature springs can be easily damaged. Further, when poorly handled, the miniature springs can be deformed.

A device provided with a rotary vane that rotates with a high speed is known as a means for separating a plurality of tangled springs. In such a device, a plurality of tangled springs collide with the aforementioned rotary vane that rotates with a high-speed and are scattered. Due to the impact during the collision, the tangled springs are forcibly separated. However, when such a separation means is used, the tangled springs collide with the rotary vane that rotates with a high speed and the springs themselves are subjected to strong impacts. In particular, in a case of miniature springs of a very small wire diameter, a sufficient resistance to the impacts occurring during collision with the rotary vane cannot be ensured, the spring shape is deformed or the miniature springs are elongated or broken, thereby creating defective spring products. The inventors have already addressed this problem and made it possible to separate the tangled miniature springs, practically without damaging the springs, and feed the miniature springs one by one to an operator (Japanese Patent No. 3386401).

In a case where miniature springs are present among the springs, because the wire diameter thereof is very small, as described hereinabove, the defective products that have already been deformed can be present at a stage before loading into the spring feeder. Further, even with the separation means provided in the spring feeder disclosed in Japanese Patent No. 3386401, the tangled miniature springs still can fail to separate, although the probability of such an event is extremely low. Such defective miniature springs that are not in the normal state can be mixed together with the normal miniature springs, and the defective miniature springs can be conveyed to the final conveying path of the spring feeder.

The defective miniature springs can be of various types. For example, a single miniature spring can be slightly arc-like curved with respect to the axial line in the compression-elongation direction. The defective miniature springs of this type can enter the final end portion of the conveying path for feeding of the spring feeder. Further, in a state in which a plurality of springs are tangled, the springs constitute an almost linear row-like configuration along the compression-elongation direction thereof and can enter in this state the final end portion of the conveying path for feeding of the spring feeder. Usually, the conveying path outside of the spring feeder is a groove-like passage and the conveying direction is most often shaped along an almost arc-like line along the outer circumference of the spring feeder body.

In order to enable the groove in the final end portion of the conveying path for feeding to feed the miniature springs one by one, the groove in this portion is formed to have a width that is sufficiently small to pass only one miniature spring. Because of such a configuration, a defective miniature spring such as described hereinabove can be easily caught in the groove-like passage of the conveying path for feeding (in particular, in a zone where the passage is curved in an arc-like shape) in the final end portion of the conveying path for feeding of the spring feeder. For this reason, a plurality of the miniature springs that follow the defective miniature spring can jam the passage and the conveying of the springs can be stopped.

SUMMARY OF THE INVENTION

For this reason, the springs are often not supplied in a stable state to the operator's hands and therefore the operation efficiency drops. Thus, when defective springs (in particular, miniature springs) that have reached the final end portion of the conveying path for feeding despite the strict sorting are caught in the conveying path for feeding and the conveying path for feeding is jammed by the following springs, it is an object of the present invention to remove this jammed state and enable a stable feed of the springs at all times.

Accordingly, the inventors have conducted a comprehensive research aimed at the resolution of the above-described problems. The results obtained demonstrated the following. Thus, the invention as set forth in claim 1 resolves the above-described problems with a spring feeder including: a container to which vibrations are appropriately provided; separation means for separating tangled springs; and a conveying path for feeding springs that is disposed outside the container and conveys springs inside the container to the outside of the container, wherein a conveying portion for connection that has a conveying groove for connection is provided in an end portion of the conveying path for feeding, an ejection portion for spring removal that has an ejection nozzle is attached in an appropriate position of the conveying groove for connection, a distal end of the ejection nozzle of the ejection portion for spring removal is brought close to the conveying groove for connection, and an ejection direction of the ejection nozzle is substantially opposite to a direction of conveying the springs.

The invention as set forth in claim 2 resolves the above-described problems with a spring feeder according to claim 1, wherein the conveying groove for connection is constituted by an arc-like groove region portion and a straight groove region portion, and the distal end of the ejection nozzle of the ejection portion for spring removal is provided in the arc-like groove region portion. The invention as set forth in claim 3 resolves the above-described problems with a spring feeder according to claim 1, wherein the conveying groove for connection is constituted by an arc-like groove region portion and a straight groove region portion, and the distal end of the ejection nozzle of the ejection portion for spring removal is provided in the straight groove region portion. The invention as set forth in claim 4 resolves the above-described problems with a spring feeder according to claim 1, wherein the conveying groove for connection is constituted by an arc-like groove region portion, a straight groove region portion, and a boundary groove region portion, and the distal end of the ejection nozzle of the ejection portion for spring removal is provided in the boundary groove region portion located between the arc-like groove region portion and the straight groove region portion.

The invention as set forth in claim 5 resolves the above-described problems with a spring feeder according to claim 1, wherein an air jet of the ejection portion for spring removal is operated intermittently by a timer control. The invention as set forth in claim 6 resolves the above-described problems with a spring feeder according to claim 1, wherein a cover member is provided along the direction of conveying the springs in the conveying groove for connection, a gap is provided between the conveying groove for connection and the cover member, and the distal end of the ejection nozzle is brought close to the gap.

The invention as set forth in claim 7 resolves the above-described problems with a spring feeder according to claim 1, wherein the conveying path for feeding is provided with a first sorting and conveying portion and a second sorting and conveying portion, the first sorting and conveying portion, the second sorting and conveying portion, and the conveying portion for connection are linked in this order from the container side, a conveying groove of the second sorting and conveying portion is formed narrower than a conveying groove of the first sorting and conveying portion, and only one spring is loaded in the conveying direction in the conveying groove of the second sorting and conveying portion.

The invention as set forth in claim 8 resolves the above-described problems with a spring feeder according to claim 7, wherein a sorting notch portion is formed at one end side or the other end side in the groove widthwise direction in the conveying groove of the first sorting and conveying portion. The invention as set forth in claim 9 resolves the above-described problems with a spring feeder according to claim 7, wherein a sorting piece is attached in a position close to the conveying groove of the second sorting and conveying portion, and only when a spring passes through the conveying groove appropriately, the spring does not come into contact with the sorting piece.

In accordance with the invention as set forth in claim 1, an ejection portion for spring removal that has an ejection nozzle is attached in an appropriate position of the conveying groove for connection in the conveying portion for connection of the conveying path for feeding, a distal end of the ejection nozzle of the ejection portion for spring removal is brought close to the conveying groove for connection, and the distal end of the ejection nozzle is set so that the ejection direction is almost opposite to a conveying direction of the springs. Therefore, the defective spring that is a source of jamming and all the springs that have been stopped inside the conveying groove for connection are blown off and the jamming is released.

In particular, with the defective miniature springs, when the springs have a very small degree of damage and are only slightly curved in the compression-elongation direction, or when two miniature springs are tangled in a state in which they are joined in an almost row-like configuration in the compression-elongation direction, or two miniature springs are superimposed and tangled so as to look substantially as one miniature spring, such springs only rarely cannot be sifted out in the sorting means provided in the conveying path for feeding on the outside of the container. Therefore, such defective miniature springs enter the final end portion of the conveying path for feeding and are caught therein, thereby causing the jamming of the path with a large number of miniature springs. Even in such a case, the miniature springs jamming the final end portion of the conveying path for feeding are blown off by the ejection portion for spring removal, the jamming can be instantaneously released, and normal feed of the springs can be conducted.

In accordance with the invention as set forth in claim 2, the arc-like groove region portion is positioned at the initial end side of the conveying path for connection, thereby making it possible to release the jamming of springs at a comparatively early stage. In accordance with the invention as set forth in claim 3, the air ejected from the ejection nozzle is linearly supplied into the straight groove region portion. Therefore, the loss of air pressure in the straight groove region portion is comparatively low, and the springs jamming the conveying groove for connection can be blown off and the jamming can be released, while maintaining a high pressure. In accordance with the invention as set forth in claim 4, it is possible to remove the jamming of the boundary groove region portion, which is the boundary between the arc-like groove region portion and the straight groove region portion, where the defective springs can be most easily caught.

In accordance with the invention as set forth in claim 5, the air jet of the ejection portion for spring removal is operated intermittently by a timer control. Therefore, the jamming can be released periodically and stable feed of the springs can be maintained. In accordance with the invention as set forth in claim 6, a cover member is provided along the conveying direction of the springs in the conveying groove for connection, a gap is provided between the conveying groove for connection and the cover member, and a distal end of the ejection nozzle is brought close to the gap. As a result, when the springs jamming the inside of the conveying gap for connection are removed, the springs can be returned to a specific position in a concentrated manner, without scattering a large number of springs around the feeder.

In accordance with the invention as set forth in claim 7, practically all defective springs such as tangled springs and deformed springs are sifted out in the process of conveying from the first sorting and conveying portion to the second sorting and conveying portion. In accordance with the invention as set forth in claim 8, defective springs such as tangled springs and deformed springs can be removed from the sorting notch portion in the process of conveying the springs in the first sorting and conveying portion. In accordance with the invention as set forth in claim 9, even when the tangled springs or deformed springs are only slightly different in terms of external appearance from the normal springs, these defective springs can be sifted out and the defective springs can be removed in the process of conveying the springs in the second sorting and conveying portion. All the above-described effects are demonstrated even more dramatically when the above-described springs are miniature springs.

BRIEF DESCRIPTION OF THE DRAWINGS

FIG. 2A is a partially cut-out plan view of portion (a) shown in FIG. 1A, and FIG. 2B is a perspective view illustrating an exploded state of the principal part of the conveying portion for connection. FIG. 2C is a plan view of the conveying portion for connection from which the cover member has been removed. FIG. 2D is a sectional view along the Xa-Xa arrow in FIG. 2B;

FIG. 5A is a simplified view of a spring in a normal state, FIG. 5B is a simplified view of a defective spring that has curved in the compression-elongation direction, FIG. 5C is a simplified view of defective springs that have tangled at a very small intersection angle to the axial line in the compression-elongation direction, and FIG. 5D is a simplified view of defective springs that have tangled at a very small intersection angle to the axial line in the compression-elongation direction;

DESCRIPTION OF THE PREFERRED EMBODIMENTS

Figure 1A:
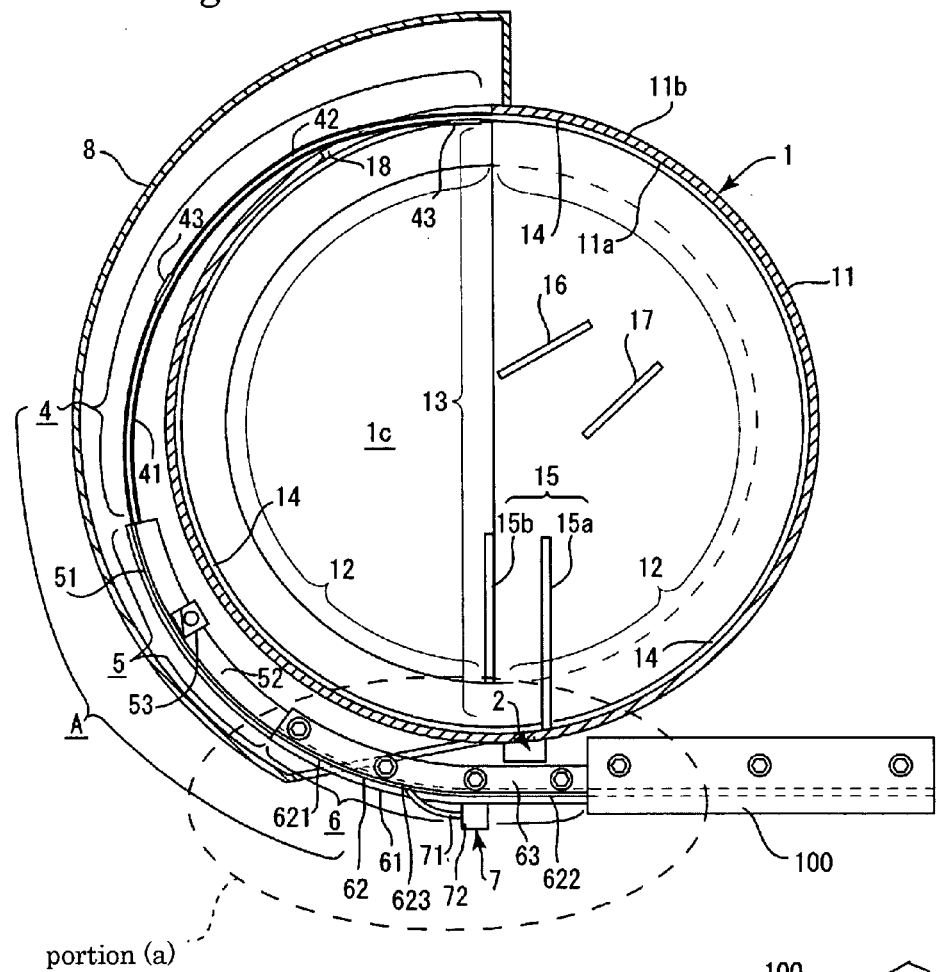
FIG. 1A is a plan view showing a partial cross section of the configuration in accordance with the present invention.
Figure 6:
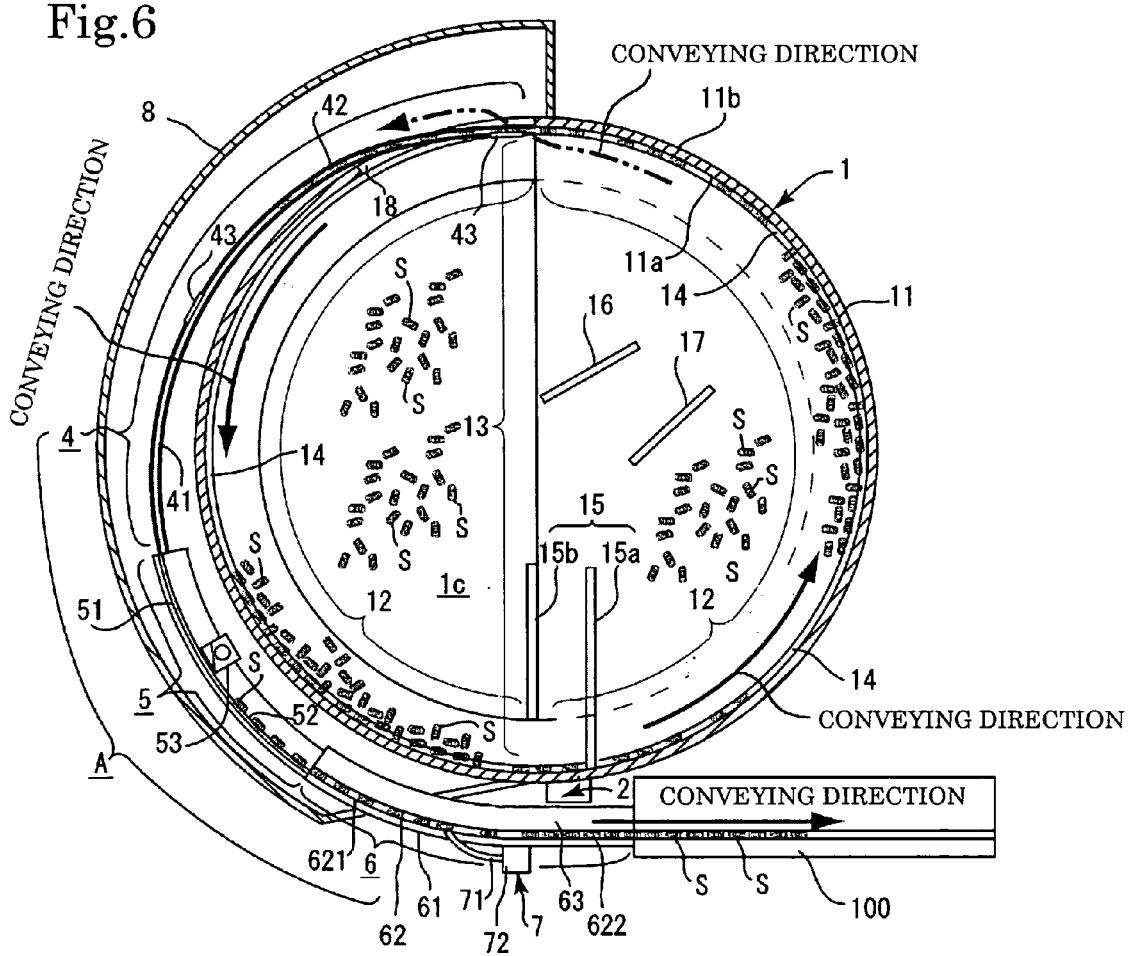
FIG. 6 is a plan view illustrating a state in which a spring is conveyed from the conveying path for feeding to an external device in accordance with the present invention.
Figure 13:
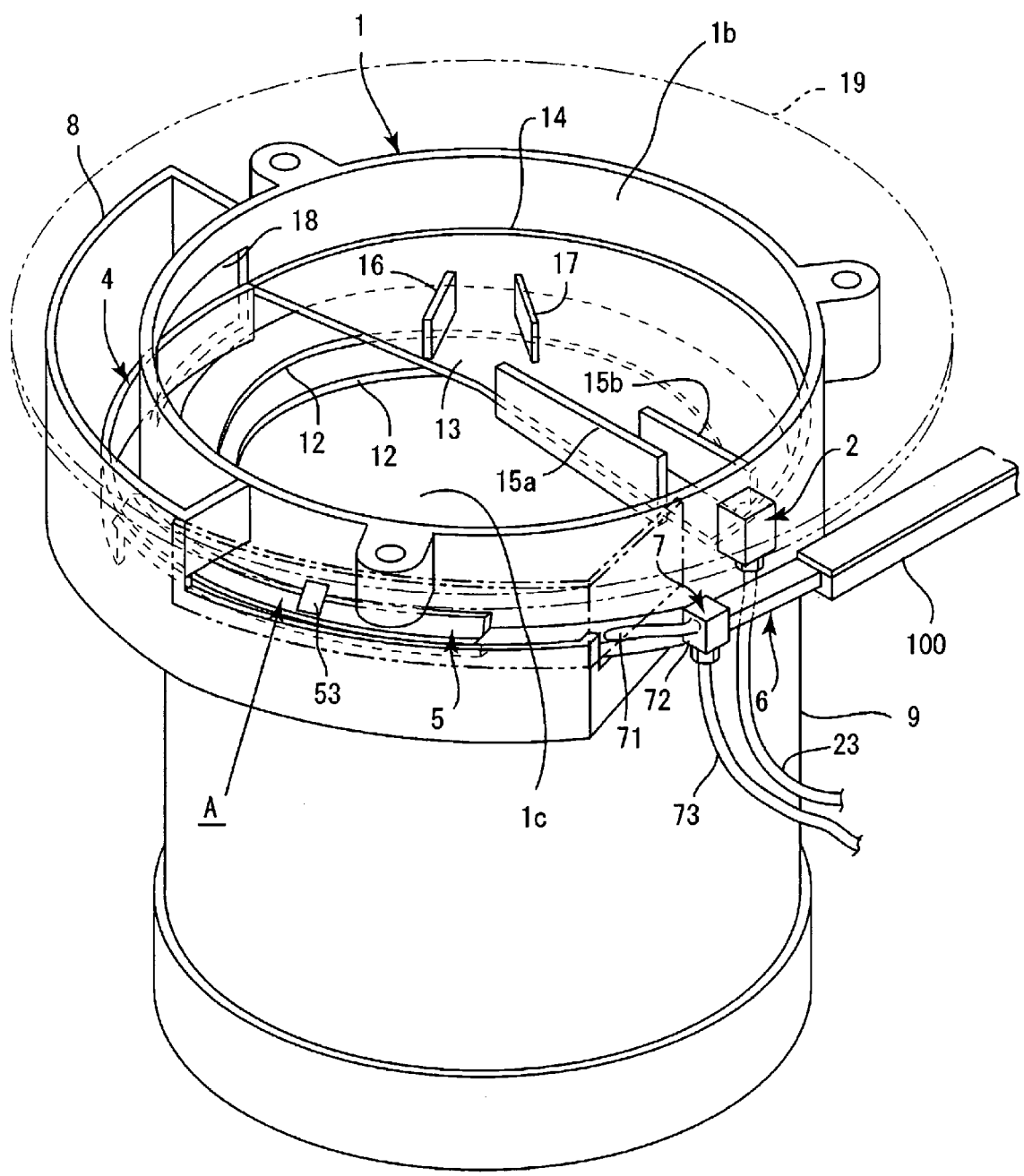
FIG. 13 is a perspective view illustrating the entire configuration in accordance with the present invention.
Figure 14A:
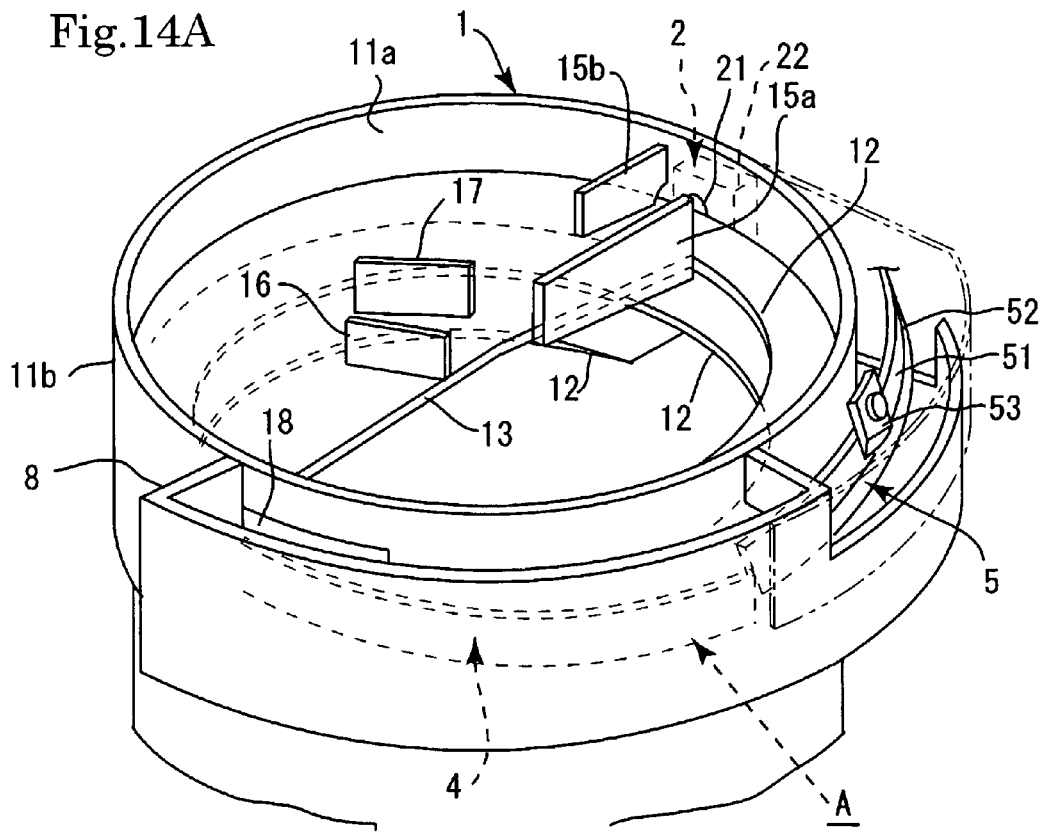
FIG. 14A is a principal perspective view of the configuration in accordance with the present invention.
Figure 14B:
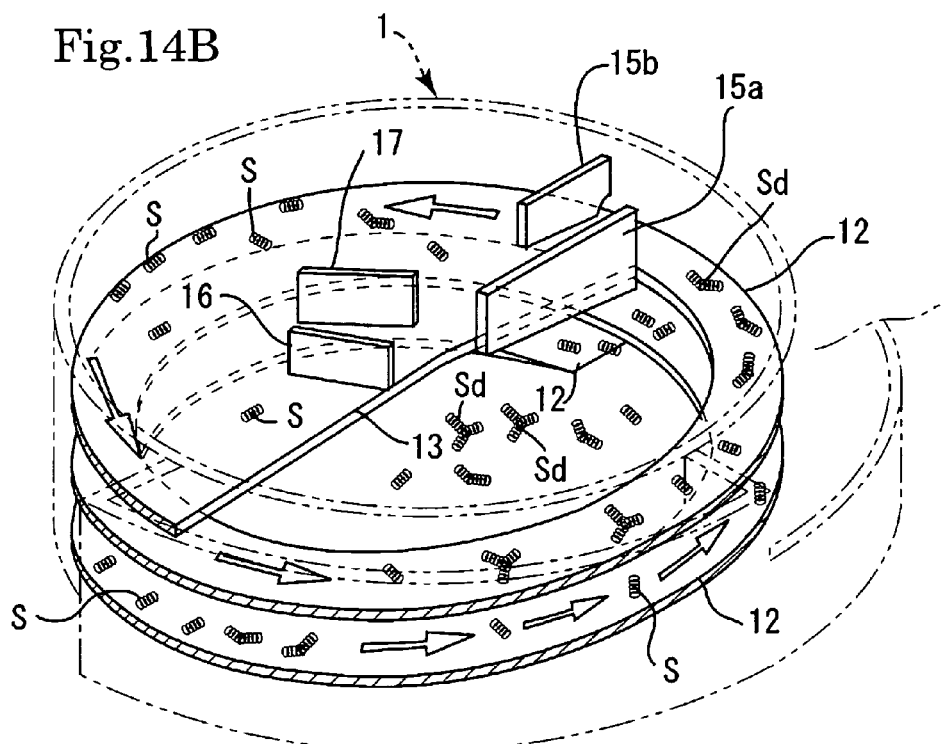
FIG. 14B is a principal perspective view illustrating the configurations of the conveying path and sorting plate in accordance with the present invention.

An embodiment of the present invention will be explained below with reference to the appended drawings. First, the entire configuration will be explained. As shown in FIGS. 1A, 6, and 13, the feeder in accordance with the present invention is mainly constituted by a container 1, a conveying path A for feeding, and a vibrator 9. As shown in FIGS. 13 and 14, the container 1 is formed in an almost flat cylindrical shape. The container 1 is constituted by a circumferential wall 11, a conveying path 12, and a sorting plate 13. The circumferential wall 11 is formed in an almost cylindrical shape, and the conveying path 12 is formed in the inner side surface 11a of the circumferential wall 11 (see FIGS. 1A, 13, and 14).

Figure 15A:
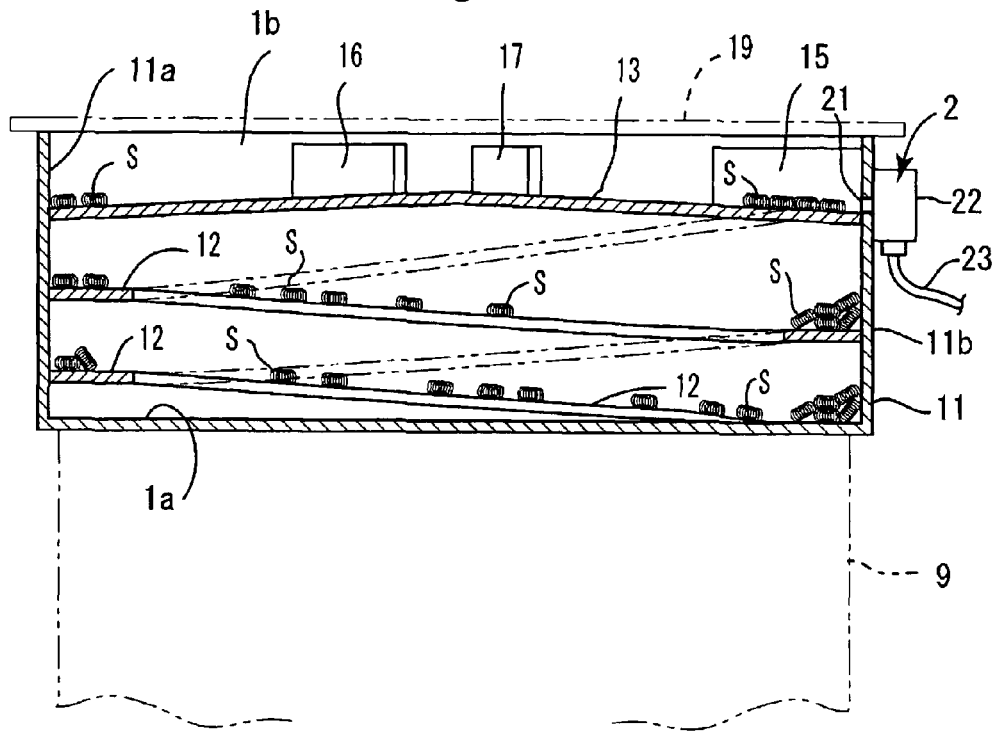
FIG. 15A is a principal vertical sectional view of the configuration in accordance with the present invention.
Figure 15B:
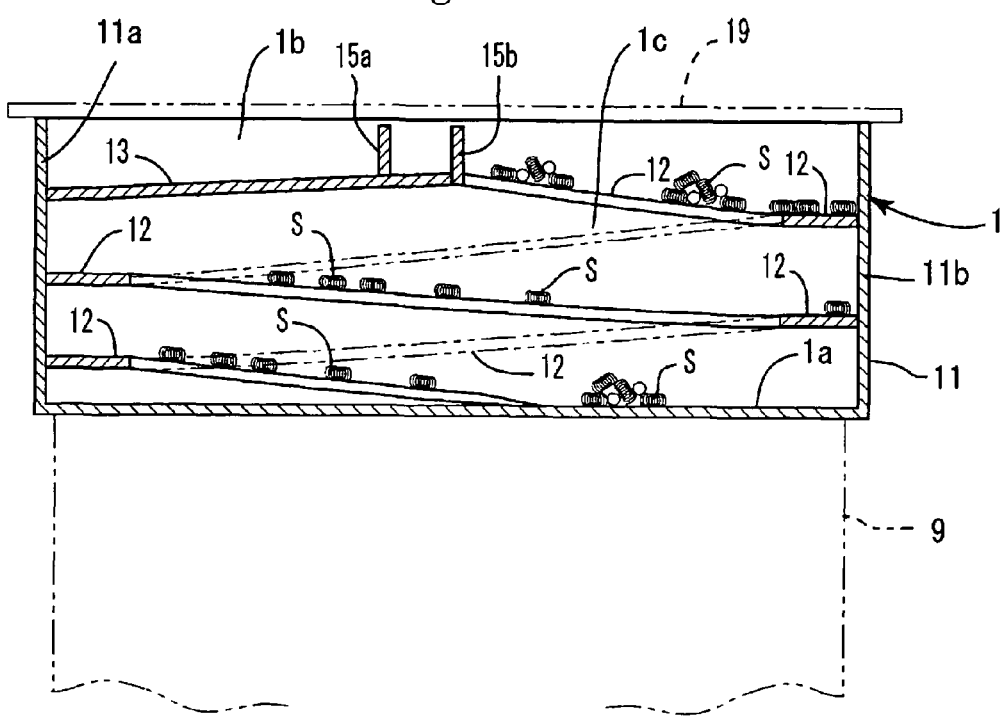
FIG. 15B is a principal vertical sectional view from a direction difference from that in FIG. 15A.

Further, the sorting plate 13 is formed at the upper portion 1b of the circumferential wall 11 of the container 1, and the sorting plate 13 communicates with the conveying path 12 (see FIGS. 13 to 15). An inner conveying groove 14 is formed in a corner location formed by the conveying path 12, the sorting plate 13, and inner side surface 11a (see FIGS. 1A, 11A, 11B, and 13). A through port 18 is formed in a position in the height direction where the sorting plate 13 of the container 1 is formed. The through port 18 is formed as an opening for linking the inner conveying groove 14 with the conveying path A for feeding that is attached to the outer part of the container 1 (see FIGS. 1A, 11A, 11B, and 13).

The conveying path A for feeding is a component that plays a role of conveying an appropriate spring S sorted inside the container 1 to the outside of the spring feeder in accordance with the present invention and feeding the spring to an operator, or a role of feeding, if necessary, the spring S to another device. As shown in FIGS. 1A and 6, the conveying path A for feeding is a component disposed on the outside of the circumferential wall 11 of the container 1 and is formed in an almost circular arc shape, with the longitudinal direction thereof being along the circumferential wall 11, at a predetermined distance from the circumferential wall 11. Further, the conveying path A for feeding is constituted along an almost half of the circumference of the circumferential wall 11 of the container 1 (see FIG. 1A). The longitudinal direction of the conveying path A for feeding, as referred to herein, is a direction equivalent to the conveying direction in which the spring S is conveyed. The conveying direction in which the spring S is conveyed will be simply referred to hereinbelow as "conveying direction".

Figure 1B:
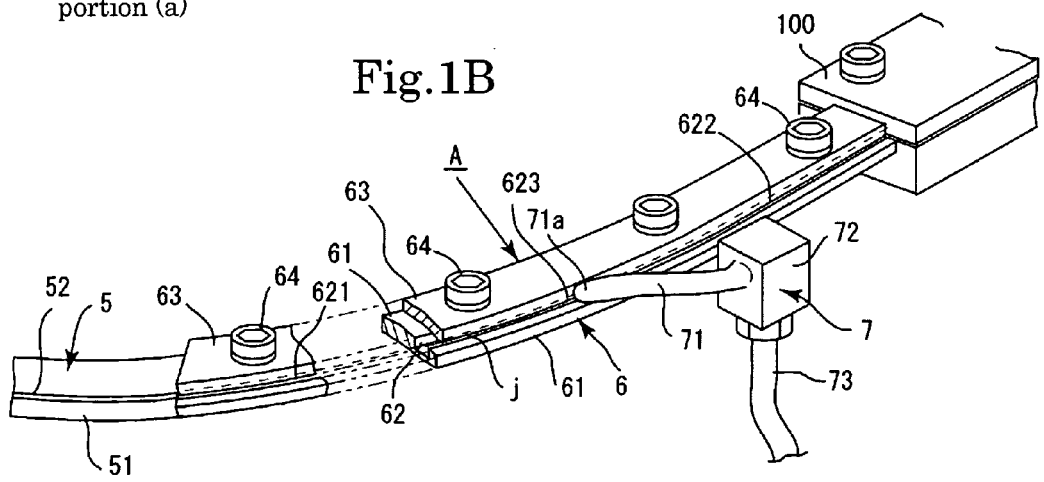
FIG. 1B is a partially cut-out perspective view of portion (a) shown in FIG. 1A.

The conveying path A for feeding is constituted by a first sorting and conveying unit 4, a second sorting and conveying unit 5, and a conveying unit 6 for connection (see FIGS. 1 and 6). Further, the conveying path A for feeding is vibrated together with the container 1 by the vibrator 9, and the spring S is conveyed from inside of the conveyor 1 along the first sorting and conveying unit 4, second sorting and conveying unit 5, and conveying portion 6 for connection of the conveying path A for feeding. The conveying direction of the spring S inside the container 1 and the conveying path A for feeding is shown by a thick solid arrow in FIG. 6. In FIG. 6, the direction in which the spring S is conveyed from the inner conveying groove 14 located inside the container 1 to the first sorting and conveying unit 4 of the conveying path A for feeding via the through port 18 is shown by a thick dot-line arrow.

Figure 11A:
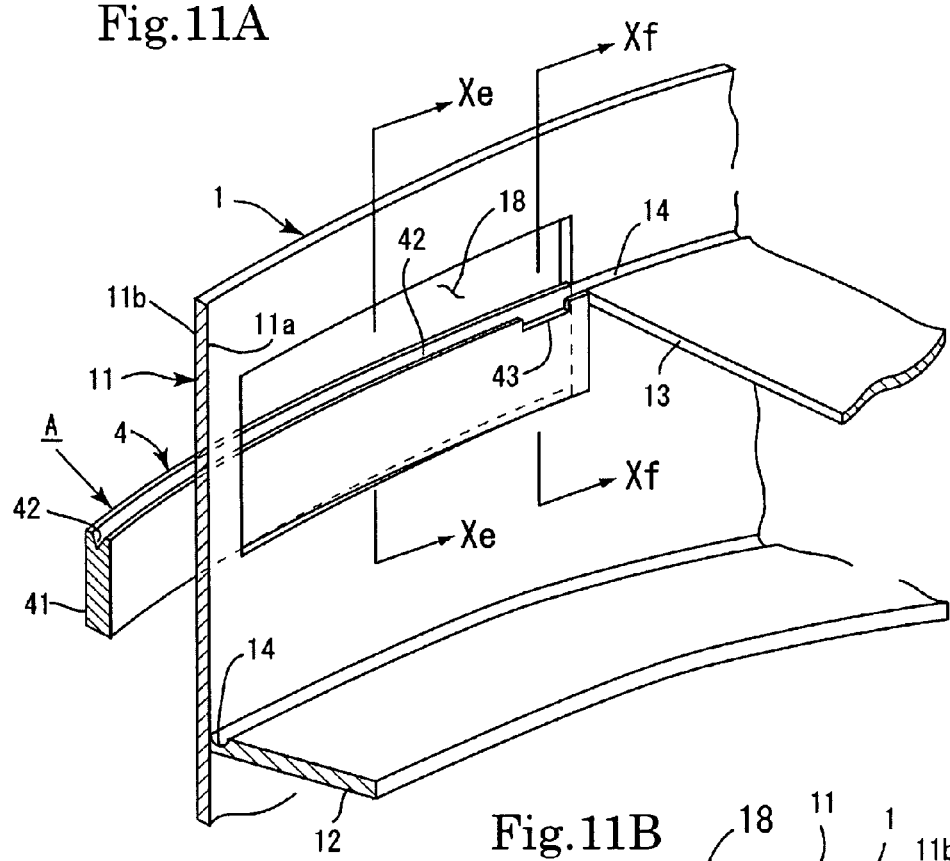
FIG. 11A is a principal perspective view of the first sorting and conveying portion.
Figure 11B:
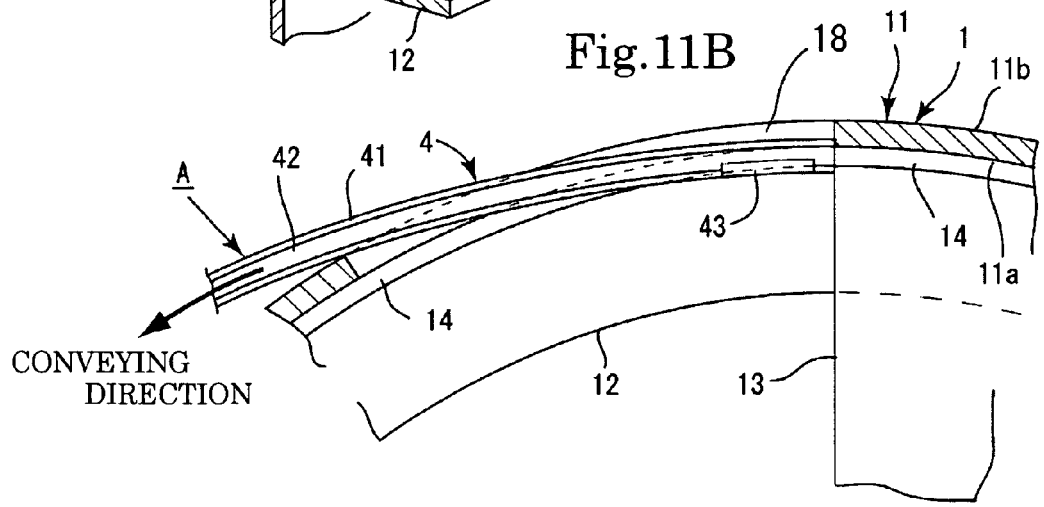
FIG. 11B is a principal transverse plan view of the first sorting and conveying portion.

The base end portion of the first sorting and conveying unit 4 is configured to communicate via the through port 18 with the inner conveying groove 14 formed in the sorting plate 13 located inside the container 1 (see FIGS. 1A, 11A, and 11B). The base end portion of the first sorting and conveying unit 4 assumes a state of slightly penetrating from the through port 18 into the container 1. The first sorting and conveying unit 4 is formed as an arc, with the longitudinal direction thereof being along the outer circumference of the container 1. The first sorting and conveying unit 4 has a conveying groove 42 formed in a base portion 41. The conveying groove 42 communicates with the inner conveying groove 14 and the 18 (see FIGS. 1A, 11A, and 11B).

Figure 11C:
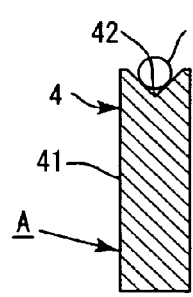
FIG. 11C is an end surface view along the Xe-Xe arrow in FIG. 11A.
Figure 11D:
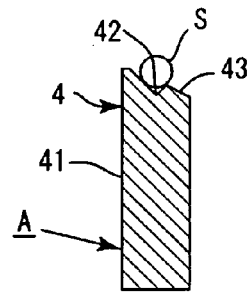
FIG. 11D is an end surface view along the Xf-Xf arrow in FIG. 11A.
Figure 11E:
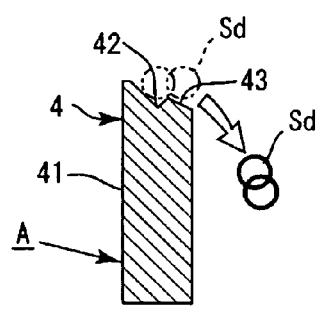
FIG. 11E is an operation diagram illustrating how a defective spring is sifted out.

As shown in FIGS. 11A to 11C, the base portion 41 is formed in a band-like shape, and the cross section thereof perpendicular to the longitudinal direction thereof (conveying direction) has an almost rectangular shape. The base portion is formed so that the long side direction thereof is a vertical direction. As shown in FIG. 11C, the conveying groove 42 is formed in the apex of the base portion 41, and the cross section thereof has an almost V-like shape. More specifically, an angle formed by both inclined surfaces that constitute the V-like shape is 90 degrees or an angle close to 90 degrees (within a range of 85 to 90 degrees). The cross section of the conveying groove 42 may have an almost semicircular shape (U-like shape) or an angular shape (rectangular shape, square shape).

A sorting notch portion 43 is formed in the first sorting and conveying unit 4 (see FIGS. 11A, 11B, 11D, and 11E). The sorting notch portion 43 is a portion formed by cutting out an upper portion, while leaving a very small lower portion, of either of the tilted surface portions at both sides in the widthwise direction of the conveying groove 42. In the conveying groove 42 in which the sorting notch portion 43 is formed, both the groove width and the groove depth locally decrease and two or more defective springs Sd that became tangled and form a lump are sifted out by the sorting notch portion 43 (see FIG. 11E).

Such sorting notch portions 43 are provided at the first sorting and conveying unit 4 in two or more locations. More specifically, the sorting notch portions 43 are formed at one end and the other end of the conveying groove 42 in the widthwise direction. In the conveying groove 42 positioned in the location of the through port 18, the sorting notch portion 43 is formed so as to be positioned on the inner side of the container 1, and the defective springs Sd that are to be sifted out from the sorting notch portion 43 fall into the container 1. Further, in the sorting notch portion 43 formed in the other position, the defective springs Sd fall to the outside of the container 1. In this case, the defective springs Sd are sifted out into an auxiliary container 8 that is formed in the outer side surface 11b of the circumferential wall 11 of the container 1. The auxiliary container 8 communicates with a bottom portion 1a of the container 1, and the defective springs Sd that have been sifted out from the sorting notch portion 43 are returned to the bottom portion 1a of the container 1 and again conveyed upward from the bottom portion 1a of the container 1.

Figure 12A:
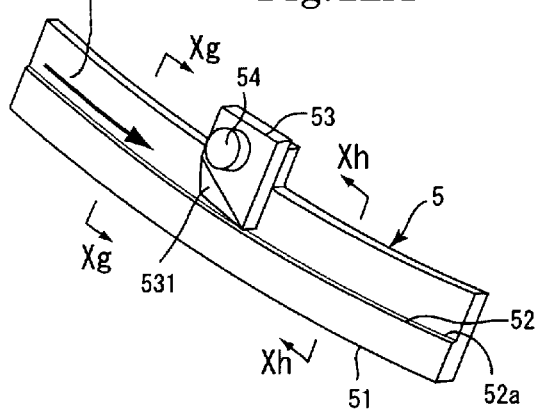
FIG. 12A is a principal perspective view of the second sorting and conveying portion.

As shown in FIG. 12A, the second sorting and conveying unit 5 is constituted by a base portion 51, a conveying groove 52, and a sorting piece 53. The base portion 51 has a band-like shape and is in the form of an arc in the plan view thereof (see FIG. 1A). The cross section thereof that is perpendicular to the conveying direction is in the form of an inclined plate (see FIGS. 12A to 12C). The conveying groove 52 is formed in an almost central portion in the height direction of the base portion 51. The conveying groove 52 is formed to have a step-like shape in an almost central position thereof in the vertical direction in a cross section that is perpendicular to the longitudinal direction of the base portion 51, and the portion thereof above the conveying groove 52 is concaved more than the portion below the conveying groove (see FIGS. 12B and 12C). In other words, the cross section of the base portion 51 is formed so that the thickness thereof above the conveying groove 52 is less than the thickness thereof below the conveying groove.

Figure 12D:
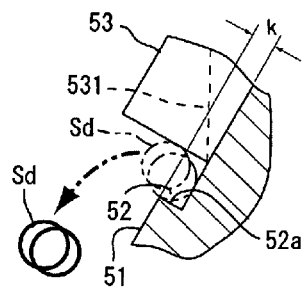
FIG. 12D is an operation diagram illustrating how a defective spring is sifted out.

In the conveying groove 52, a step surface 52a protruding to the almost central location of the surface of the base portion 51 in the vertical direction is formed in the cross section perpendicular to the longitudinal direction of the base portion 51. The size k of the protrusion of the step surface 52a of the conveying groove 52 from the surface of the base portion 51 is less than the diameter of the spring S (see FIG. 12D). In particular, in a case where the spring S is a small spring, the protrusion amount is equal to or less than about 1 mm. Where the spring S is placed in a state in which the compression-elongation direction thereof coincides with the conveying direction, the conveying groove 52 can convey only one spring (see FIGS. 12B and 12C). Therefore, when the defective springs Sd in a state in which two or more springs are tangled pass through the conveying groove 52, the defective springs Sd destroy the balance and fall down from the conveying groove 52, and the passage of such defective springs Sd is made impossible (see FIG. 12D).

Figure 12B:
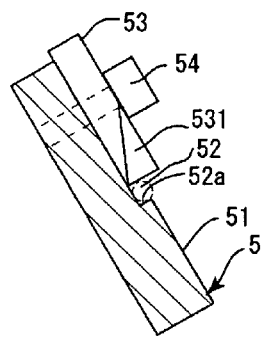
FIG. 12B is a cross-sectional view along the Xg-Xg arrow in FIG. 12A.
Figure 12C:
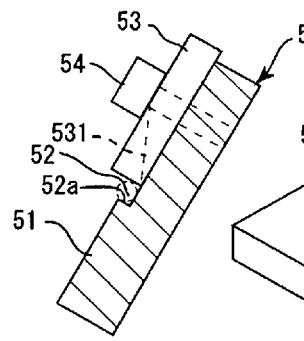
FIG. 12C is a cross-sectional view along the Xh-Xh arrow in FIG. 12A.
Figure 12E:
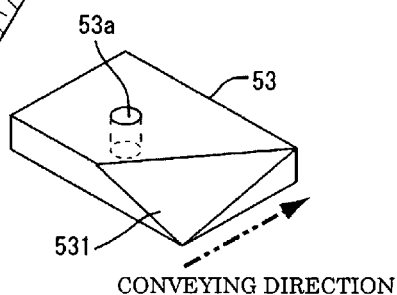
FIG. 12E is a perspective view of a sorting piece seen from beneath.
Figure 12F:
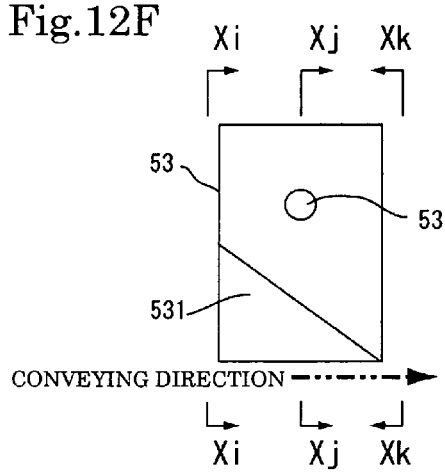
FIG. 12F is a front view of the sorting piece.
Figure 12G:
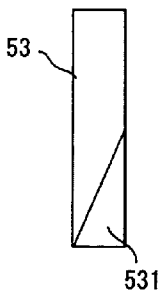
FIG. 12G is a view along the arrow Xi-Xi in FIG. 12F.
Figure 12H:
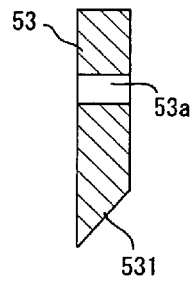
FIG. 12H is a cross-sectional view along the Xj-Xj arrow in FIG. 12F.
Figure 12I:
FIG. 12I is a view along the Xk-Xk arrow in FIG. 12F.

The sorting piece 53 is attached in the vicinity of the location where the conveying groove 52 is formed in the base portion 51 (see FIGS. 12A to 12C). The sorting piece 53 is fixedly attached to the base portion 51 of the second sorting and conveying unit 5 with a fixing jig 54 such as a bolt, and a through hole 53a through which the fixing jig 54 passes is formed in the sorting piece 53. The sorting piece 53 is provided as a member separate from the base portion 51, and as shown in FIGS. 12E and 12F, formed in an almost square plate-like shape. Any one side thereof serves as a sorting end portion 531. The sorting piece 53 is disposed at the base portion 51 so that the sorting end portion 531 comes close to the conveying groove 52. The sorting end portion 531 is a unit formed so that the lower side thereof is in the form of a triangular tilted surface (see FIG. 12E), and when the sorting piece 53 is normally attached to the base portion 51, the cross section of the sorting end portion 531 is formed to be inclined from the thin portion toward the thick portion (see FIGS. 12F to 12I).

The lower end of the 531 is set to be parallel to the conveying direction of the conveying groove 52 (see FIG. 12A), and the sorting end portion 531 is set so that a transition from the thin portion to the thick portion thereof is made along the conveying direction (see FIGS. 12A to 12C). Further, as described hereinabove, where the spring S is placed in a state in which the compression-elongation direction thereof coincides with the conveying direction, the conveying groove 52 can convey only one spring. Therefore, only the spring S in a normal state can pass through the conveying groove 52 (see FIGS. 12B and 12C). When the defective spring Sd passes through the conveying groove 52 of the second sorting and conveying unit 5, the defective spring Sd is conveyed along the conveying groove 52, and when the spring passes through the location of the sorting end portion 531 of the sorting piece 53, the deformed portion or tangled portion of the defective spring Sd comes into contact with the sorting end portion 531, the balance collapses, and the spring is sifted out from the conveying groove 52 (see FIG. 12D).

The conveying portion 6 for connection is a component that plays a role of connecting the spring feeder in accordance with the present invention to another operation device 100, as shown in FIGS. 1 and 2A. The conveying portion 6 for connection is a final end component of in the conveying path A for feeding. As shown in FIGS. 2A to 2C, in the conveying portion 6 for connection, a conveying groove 62 for connection is formed in a base member 61 for connection. The cross section of the conveying groove 62 for connection in the longitudinal direction thereof is formed in an almost square shape (see FIG. 2D). The conveying groove 62 for connection includes an arc-like groove region portion 621 that is arced in the longitudinal direction thereof, a linear groove region portion 622 that has a linear shape in the longitudinal direction thereof, and a boundary groove region portion 623 positioned between the arc-like groove region portion 621 and the linear groove region portion 622 (see FIG. 2C). The arc-like groove region portion 621 communicates with the conveying groove 52 of the second sorting and conveying unit 5. The spring S conveyed from the second sorting and conveying unit 5 passes through the arc-like groove region portion 621 and is conveyed to the 622. Thus, the conveying groove 62 for connection communicates with the arc-like groove region portion 621, boundary groove region portion 623, and linear groove region portion 622 in the order of description in the conveying direction (see FIG. 2).

Figure 3A:
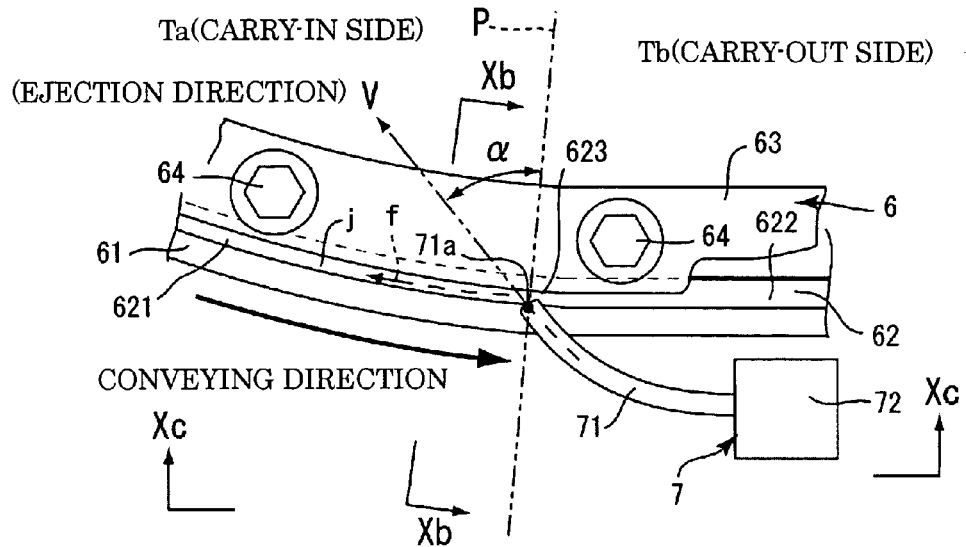
FIG. 3A is a principal enlarged plan view centered on the location of the ejection for removal in accordance with the present invention.
Figure 3B:
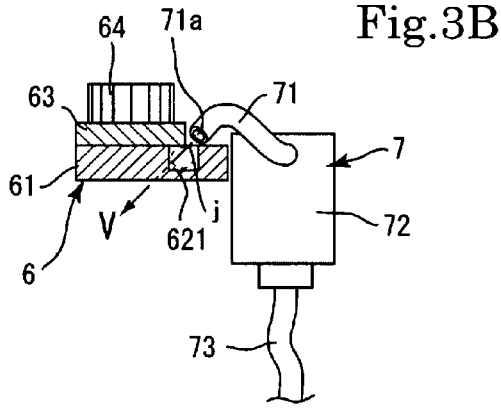
FIG. 3B is a sectional view along the Xb-Xb arrow in FIG. 3A.

A cover member 63 is also provided in the conveying portion 6 for connection (see FIGS. 2A and 2B). The cover member 63 covers the conveying groove 62 for connection formed in the base member 61 from one end side to the other end side thereof in the groove direction along the longitudinal direction thereof, and in the groove width direction of the conveying groove 62 for connection the coverage is such that the entire surface is not covered and part of the surface is in the open state (see FIGS. 2A, 2D, 3A, and 3B). More specifically in the groove width direction, the surface is covered to a position that slightly exceeds the central position in the groove width direction of the conveying groove 62 for connection. The portion that is not covered by the cover member 63 is a gap j (see FIGS. 3A and 3B).

The base member 61 and the cover member 63 are joined by bolts 64. A plurality of inner screw portions 61a, 61a, . . . are formed in the 61. Through holes 63a, 63a, . . . for screws that are equal in number to the plurality of the inner screw portions 61a, 61a, . . . are formed in the cover member 63. The bolts 64 are inserted into the through holes 63a for screws and screwed into the inner screw portions 61a, thereby fixedly joining the base member 61 to the cover member 63 (see FIGS. 1B, 2A, and 2B).

Figure 4A:
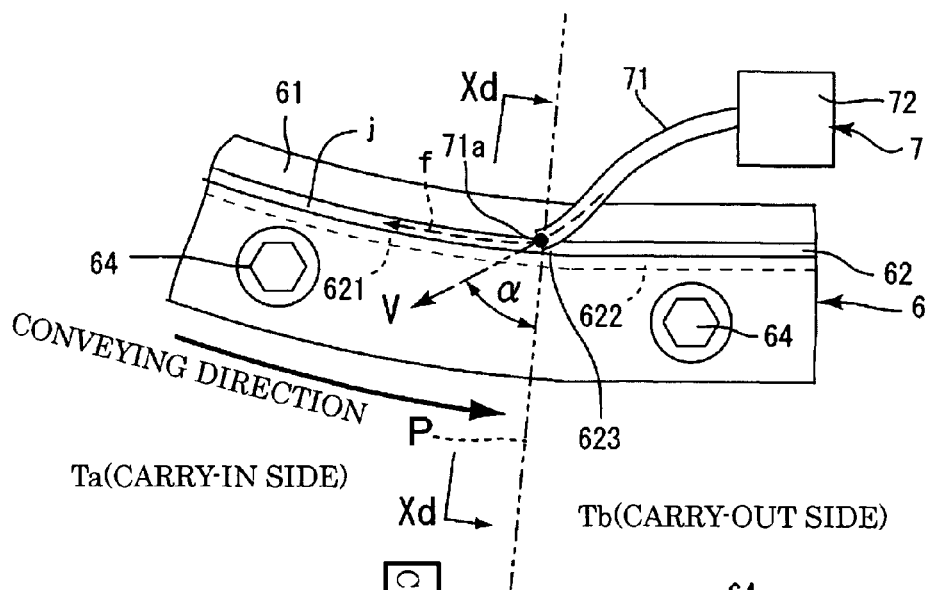
FIG. 4A is a principal enlarged plan view of another type centered on the location of the ejection portion for spring removal in accordance with the present invention.
Figure 4B:
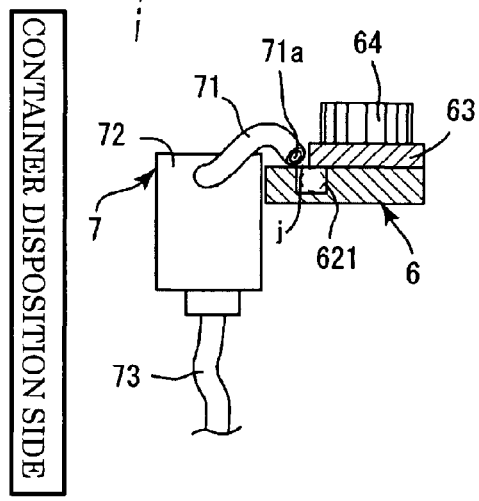
FIG. 4B is a sectional view along the Xd-Xd arrow in FIG. 4A.
Figure 4C:
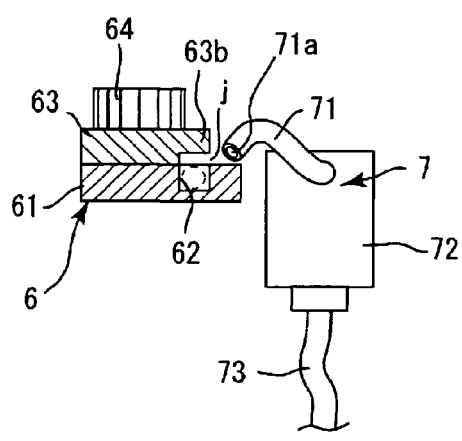
FIG. 4C is a principal enlarged plan view of yet another type centered on the location of the ejection portion for spring removal.
Figure 4D:
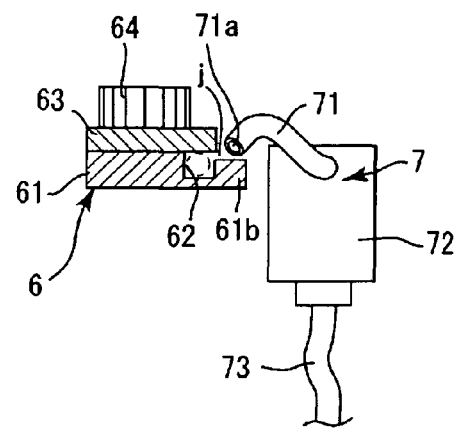
FIG. 4D is a principal enlarged plan view of still another type centered on the location of the ejection portion for spring removal.

A thin edge portion 63b is formed in the longitudinal direction of the cover member 63 at one end side in the widthwise direction thereof, and a gap j is also formed between the thin edge portion 63b and the conveying groove 62 for connection (see FIG. 4C). Further, a thin portion 61b that is formed by reducing the thickness of the base member 61 is provided along the longitudinal direction of the 62 at one side in the widthwise direction thereof, and the gap j is also formed between the thin portion 61b and the cover member 63 (see FIG. 4D).

As shown in FIGS. 1 and 2, a jet unit 7 for removal is mounted on the conveying portion 6 for connection. The ejection portion 7 for spring removal is constituted by an ejection nozzle 71 and an air valve 72. The air valve 72 is mounted on the base member 61 of the conveying portion 6 for connection. The air valve 72 is so configured that the air is supplied to an air compressor or the like (not shown in the figure) provided outside the container 1 via a tube 73. The air is ejected from a jet orifice 71a of the ejection nozzle 71 of the ejection portion 7 for spring removal by adjusting the jet pressure to a desired value.

The distal end of the ejection nozzle 71 of the ejection portion 7 for spring removal, that is, the jet orifice 71a comes close to the conveying groove 62 for connection, as shown in FIGS. 1, 2A to 2C, 3A, and 3B. Thus, the ejection portion 7 for spring removal is mounted so that the jet orifice 71a comes close to the gap j formed with the cover member 63 that covers the conveying groove 62 for connection. The ejection direction of the air jet from the jet orifice 71a located at the distal end of the 71 is substantially opposite to the direction in which the spring S is conveyed in the conveying groove 62 for connection (see FIGS. 3A and 4A).

Figure 3C:
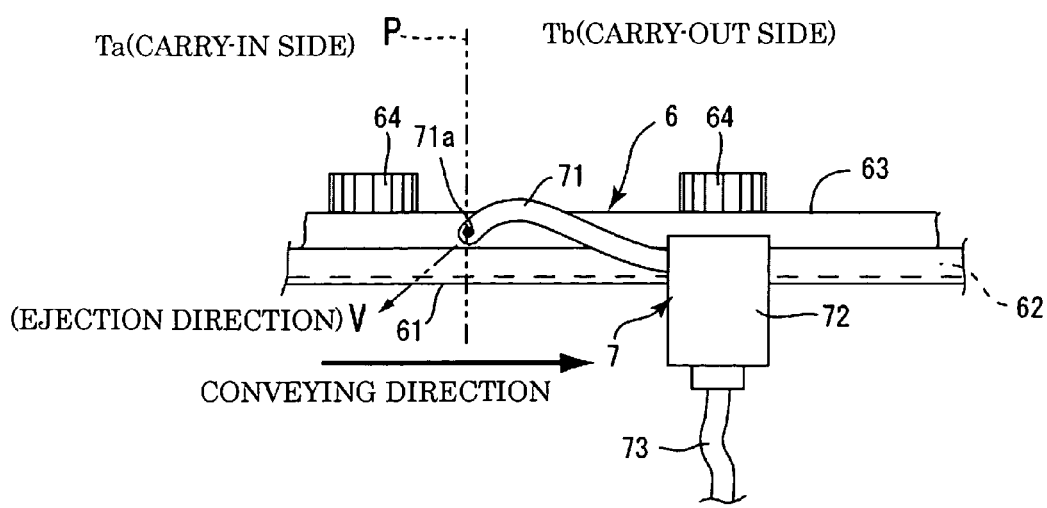
FIG. 3C is a view along the Xc-Xc arrow in FIG. 3A.

The direction that is substantially opposite to the conveying direction of the spring S will be discussed below. First, a virtual boundary plane P is set to be perpendicular to the conveying direction of the spring S in the conveying groove 62 for connection and also in a location where the jet orifice 71a of the ejection portion 7 for spring removal is positioned (see FIGS. 3A and 4A). The virtual boundary plane P is a virtual flat plane that extends radially from a point where the jet orifice 71a of the ejection nozzle 71 in the conveying groove 62 for connection is positioned (see FIGS. 3A and 3C). Then, the virtual boundary plane P where the jet orifice 71a of the ejection nozzle 71 is positioned is taken as a boundary plane of the conveying groove 62 for connection, the side of the virtual boundary plane P in the conveying direction to which the spring S arrives is called a carry-in side Ta and a side of the virtual boundary plane P from which the spring S is carried out is called a carry-out side Tb (see FIGS. 3A, 3C, and FIGS. 7 to 9).

In other words, in the virtual boundary plane P, the side to which the spring S comes close in the conveying direction is the carry-in side Ta, and the side from which the spring S withdraws from the virtual boundary plane P is the carry-out side Tb. The direction of the air ejected from the 71a, that is, the ejection direction is a direction from the position of the virtual boundary plane P toward the carry-in side Ta. This eventually creates a state in which the air is ejected from the jet orifice 71a toward the second sorting and conveying unit 5. Where a reference symbol is assigned to the ejection direction from the jet orifice 71a of the ejection nozzle 71 and this direction is taken as an air ejection direction V, then the air ejection direction V will form an angle $\alpha$ with the carry-in side Ta with respect to the virtual boundary plane P (see FIGS. 3A, 3B, and 10).

Figure 10A:
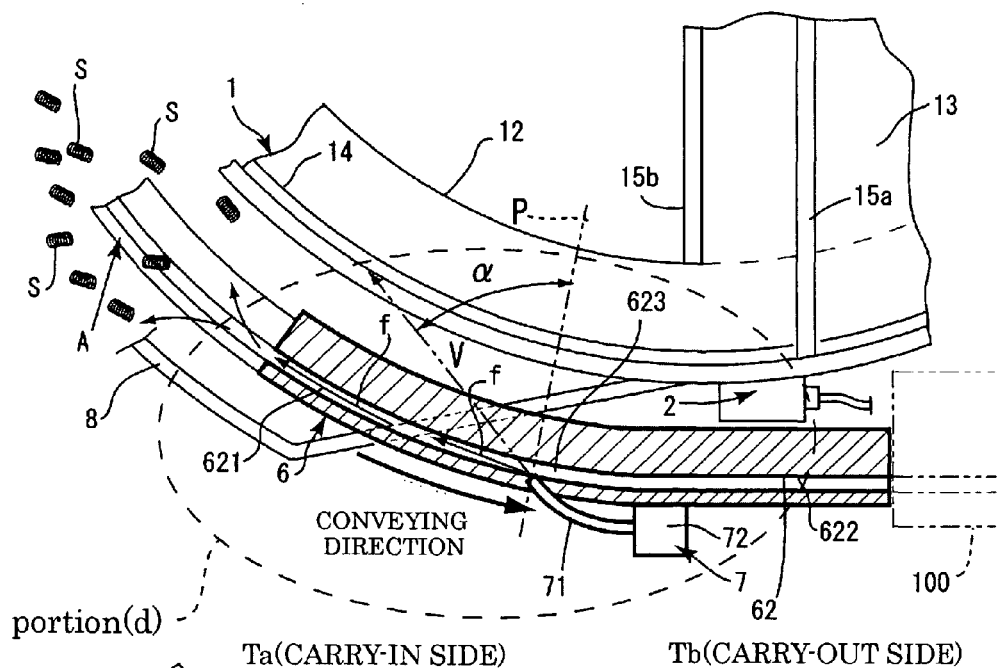
FIG. 10A is a state diagram illustrating how the jamming of the conveying groove for connection of the conveying path for feeding is released by blowing the spring off in the direction opposite to the conveying direction.
Figure 10B:
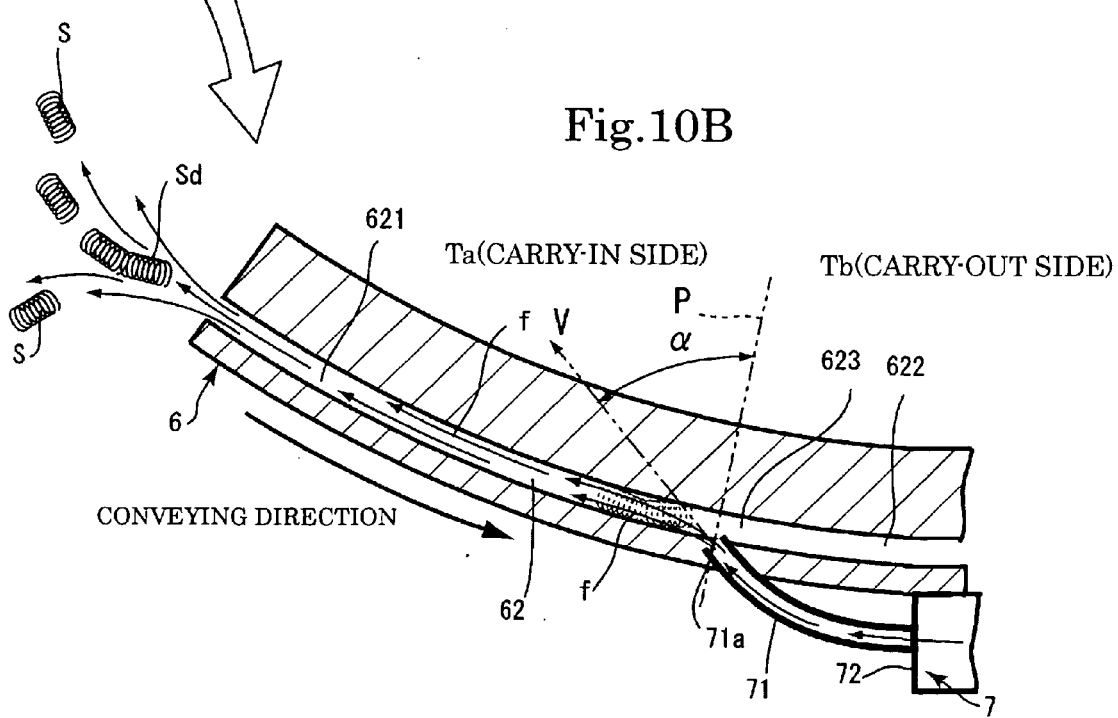
FIG. 10B is an enlarged view of the portion (e) in FIG. 10A.

Thus, the air ejection direction V from the jet orifice 71a constitutes the angle $\alpha$, with the virtual boundary plane P toward the carry-in side Ta. The angle α includes all the angles at which the air ejection direction V is from the virtual boundary plane P toward the carry-in side Ta and covers a range exclusive of 0° and 180°. The angle α is actually within a range of from about 20° to about 90°, but the appropriate inclination angle is determined by the disposition conditions of the ejection portion 7 for spring removal. Thus the direction of air ejected from the jet orifice 71a of the ejection nozzle 71 (air ejection direction V) always assumes a state opposite to the conveying direction of the spring S in the conveying groove 62 for connection.

Where the air is ejected from the jet orifice 71a of the ejection nozzle 71 of the ejection portion 7 for spring removal, most of the ejected air flows from the virtual boundary plane P toward the carry-in side Ta along the conveying groove 62 for connection and the in-groove air f that flows inside the conveying groove 62 for connection blows out the defective spring Sd and spring S that jam the inside of the conveying groove 62 for connection toward the second sorting and conveying unit 5 (see FIG. 10). Under the effect of the in-groove air f, the defective spring Sd and other spring S are blown off from the conveying groove 62 for connection and fall into the auxiliary container 8. Thus, in a case where a defective spring Sd that has been conveyed so that it narrowly escaped a very strict sorting means such as the sorting notch portion 43 or sorting piece 53 provided in the conveying path A for feeding and has reached the 62 has stuck therein and jammed the inside of the conveying groove 62 for connection, the jamming can be released by the air jet of the ejection portion 7 for spring removal.

There is a plurality of patterns for the attachment positions of the ejection portion 7 for spring removal to the conveying portion 6 for connection. In the first pattern, the position of the jet orifice 71a located at the distal end of the ejection nozzle 71 of the ejection portion 7 for spring removal is provided in the vicinity of the boundary groove region portion 623 of the arc-like groove region portion 621 and the linear groove region portion 622 (see FIGS. 1B, 2A to 2C). In this case, it is preferred that the position be slightly shifted from the boundary groove region portion 623 to the arc-like groove region portion 621. In the second pattern, the distal end of the ejection nozzle 71 of the ejection portion 7 for spring removal is provided within the range of the arc-like groove region portion 621 (see FIG. 7A).

Figure 7A:
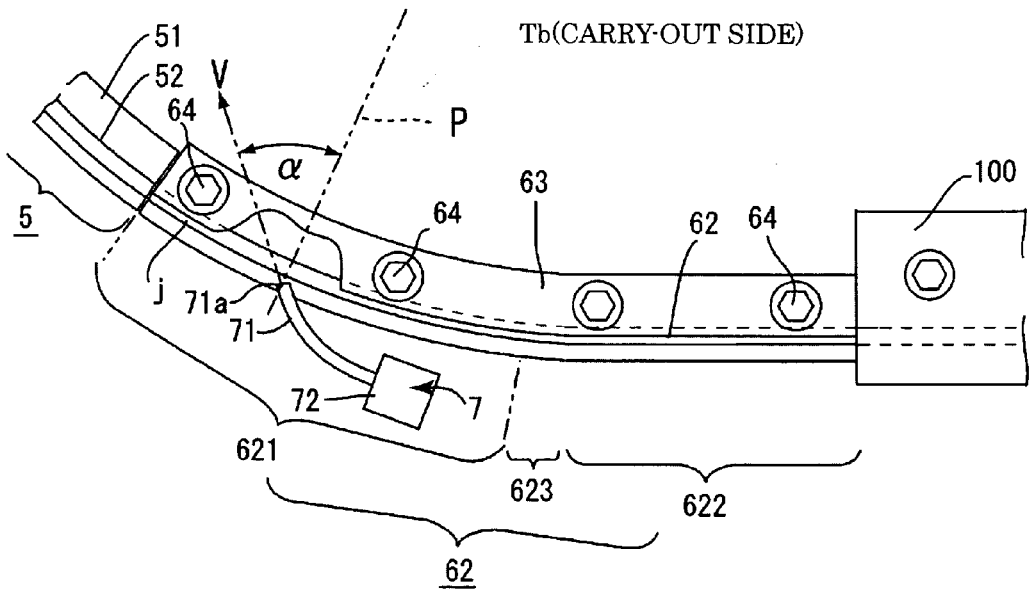
FIG. 7A is a principal plan view illustrating a state in which the ejection portion for spring removal is attached so that the distal end of the ejection nozzle is positioned in the arc-like groove region portion.
Figure 7B:
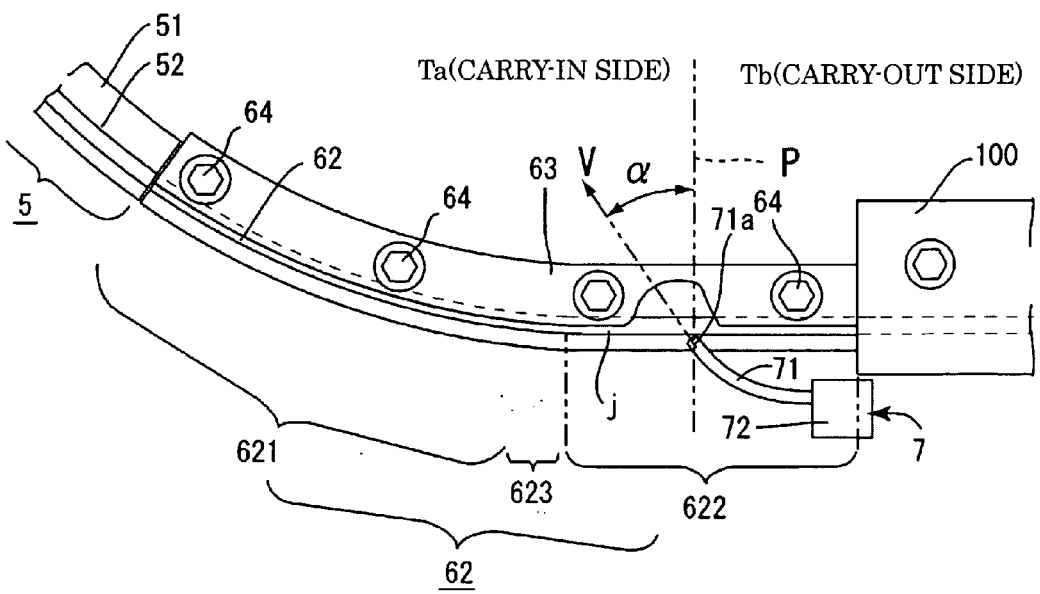
FIG. 7B is a partially cut-out principal plan view illustrating a state in which the ejection portion for spring removal is attached so that the distal end of the ejection nozzle is positioned in the straight groove region portion.

In the third pattern, the distal end of the ejection nozzle 71 of the ejection portion 7 for spring removal is provided within the range of the linear groove region portion 622 (see FIG. 7B). Further, the ejection portion 7 for spring removal is disposed at the outer side in the conveying portion 6 for connection, that is, at a side opposite that of the side where the container 1 is positioned (see FIGS. 1A, 3A, and 3B). It is also possible that the ejection portion 7 for spring removal be positioned on the inner side in the conveying portion 6 for connection, that is, on the same side where the container 1 is positioned (see FIGS. 4A and 4B). In the three patterns above, the virtual boundary plane P can be also set in the position of the jet orifice 71a of the ejection nozzle 71.

The ejection portion 7 for spring removal operates intermittently, rather than ejects the air at all times. Thus, the ejection and stop intervals are repeated with an appropriate period. Such an intermittent air ejection can be conducted under a time control. A state of controlling the start and stop of the air ejection with a timer can be specifically set to an air ejection time of about 3 sec and a stop time of about 7 sec. However, the air ejection start and stop times can be set appropriately and are not limited to the above-described numerical values. In another possible configuration, a sensor is disposed in the vicinity of the conveying groove 62 for connection, the jamming of the inside of the conveying groove 62 for connection with the defective spring Sd is detected and confirmed by the sensor, an ejection command is sent from the sensor to the ejection portion 7 for spring removal, air ejection is performed from the jet orifice 71a of the ejection nozzle 71, and the jamming is released.

The spring feeder in accordance with the present invention can handle coil-type springs S of various sizes, but is preferably applied to small-size springs, even more preferably to springs of a very small side. Springs Sofa small size have a length of about 2 mm to about 15 mm, an outer diameter of about 0.8 mm to about 3 mm, and a wire diameter of about 0.08 mm to about 0.5 mm. The miniature springs have a length of about 2 mm to about 5 mm, an outer diameter of about 0.8 mm to about 1 mm, and a wire diameter of about 0.08 mm to about 0.1 mm. In a case of miniature springs, the smallest springs have a length of about 2 mm, an outer diameter of about 0.8 mm, and a wire diameter of about 0.08 mm. In the explanation of the present invention, the spring S is a small spring, mainly a miniature spring.

A process in which the jamming by springs S caused by the defective springs Sd in the conveying groove 62 for connection is released by the ejection portion 7 for spring removal will be described below. First, a defective spring Sd that causes a large number of springs S, S, . . . to be stopped in the conveying groove 62 for connection and jam the groove will be explained with reference to FIG. 5. FIG. 5A shows a spring S in a normal state. The spring S is a coil spring, and where an axial line Ls in the compression-elongation direction thereof is set, the natural state in the compression-elongation direction of the normal spring S coincides with the axial line Ls.

The defective springs Sd can be of the following types. In the first type, the compression-elongation direction of the spring Sd is arc-like curved with respect to the axial line Ls (see FIG. 5B). Where the curvature radius R of the curve is large with respect to the compression-elongation direction of the spring Sd, because the compression-elongation direction of the spring Sd is an almost straight line, the spring passes through the sorting means of the first sorting and conveying unit 4 and the second sorting and conveying unit 5 and then passes through the conveying groove 62 for connection. In the second type of the defective spring Sd, two springs Sd are tangled with superposition so as to assume a shape almost identical to that of one spring Sd (see FIG. 5C). With this type, the tangled two springs S, S are practically not different in shape from the one spring S and are difficult to remove with the sorting means of the conveying path A for feeding. Such springs reach the conveying groove 62 for connection of the conveying portion 6 for connection and there is a sufficient probability of these springs being stuck inside the conveying groove 62 for connection.

In the third type, the springs Sd are tangled in a linked state such that the two springs constitute one line (see FIG. 5D). An angle Δθ formed by the axial lines Ls of the two springs Sd of the second and third types is very small. With the defective springs Sd of the first to third types, the compression-elongation direction of all the springs is almost linear. Therefore, it is possible that the springs will pass the sorting means of the first sorting and conveying unit 4 and the second sorting and conveying unit 5 (see FIG. 8B) and will then enter the conveying groove 62 for connection. Therefore, there is a sufficient possibility of the defective springs Sd being stuck during conveying inside the conveying groove 62 for connection (see FIG. 8B).

Figure 8A:
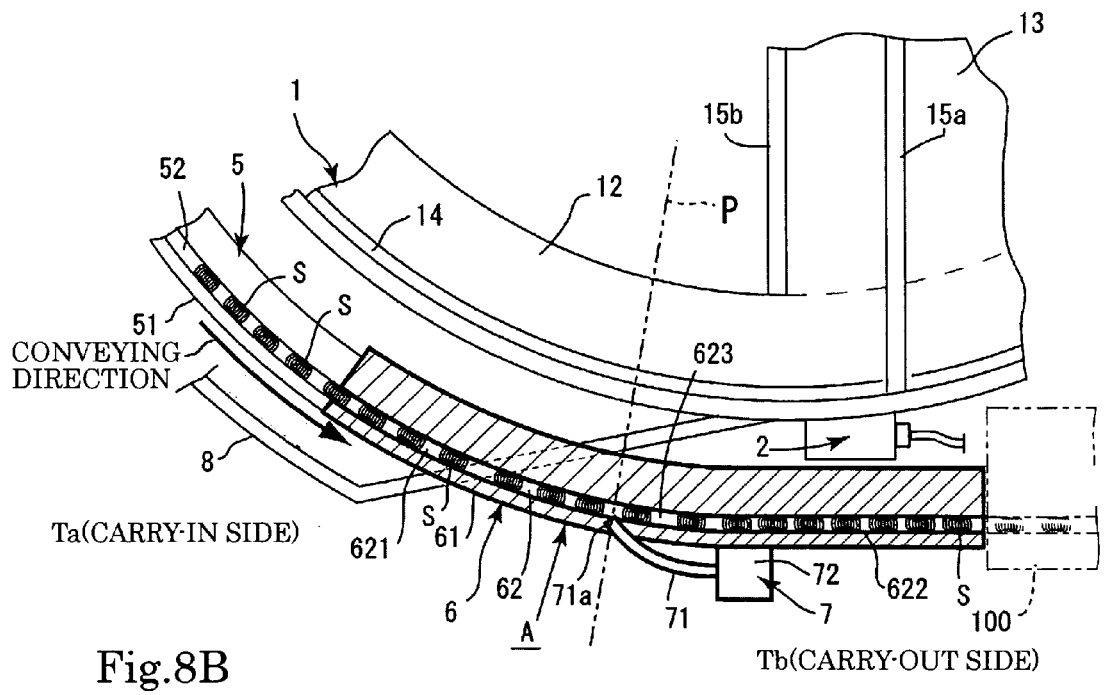
FIG. 8A is a state diagram illustrating how a spring is normally conveyed in the conveying groove for connection of the conveying path for feeding.
Figure 8B:
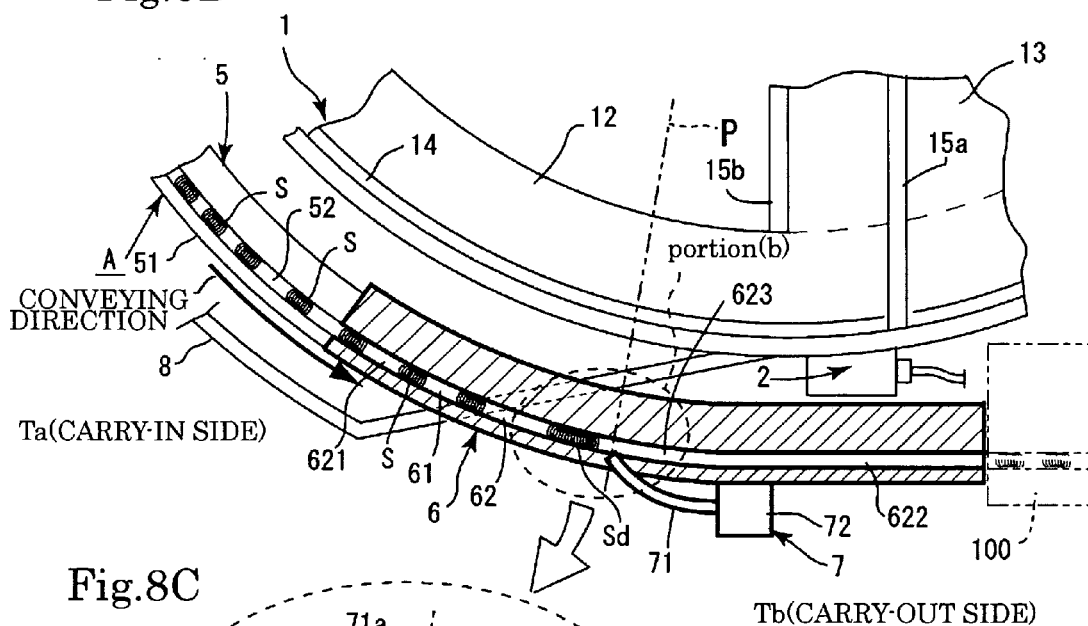
FIG. 8B is a state diagram illustrating how the conveying groove for connection is clogged by the defective spring.
Figure 8C:
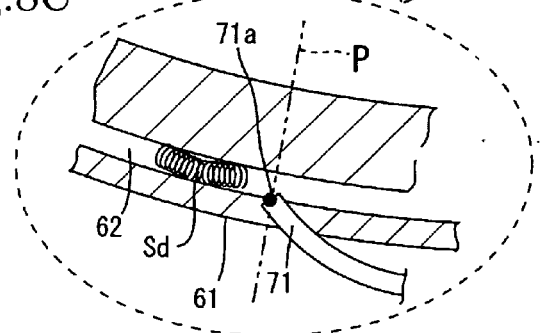
FIG. 8C is an enlarged view of the portion (b) in FIG. 8B.
Figure 9A:
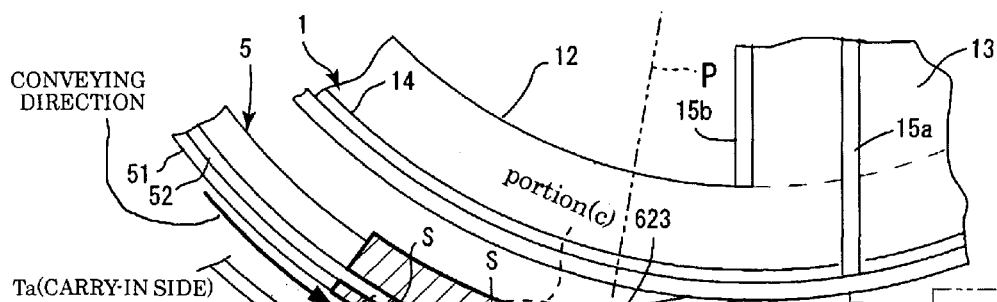
FIG. 9A is a state diagram illustrating the start of the process in which the next spring is also stopped by the defective spring.
Figure 9B:
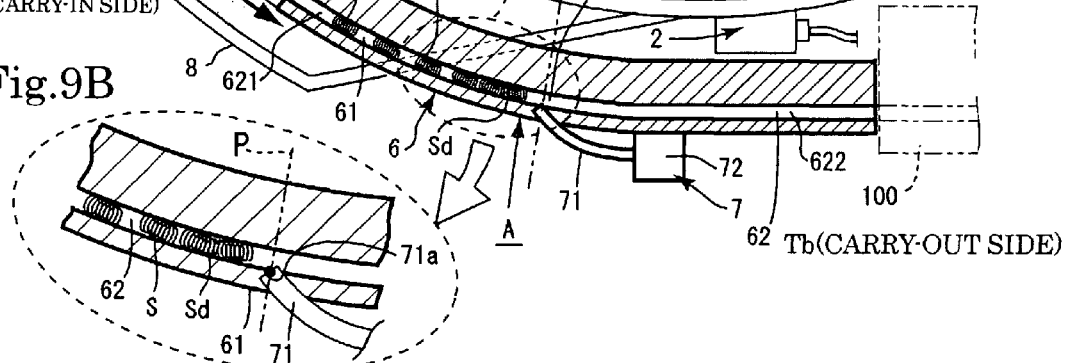
FIG. 9B is an enlarged view of the portion (c) in FIG. 9A.
Figure 9C:
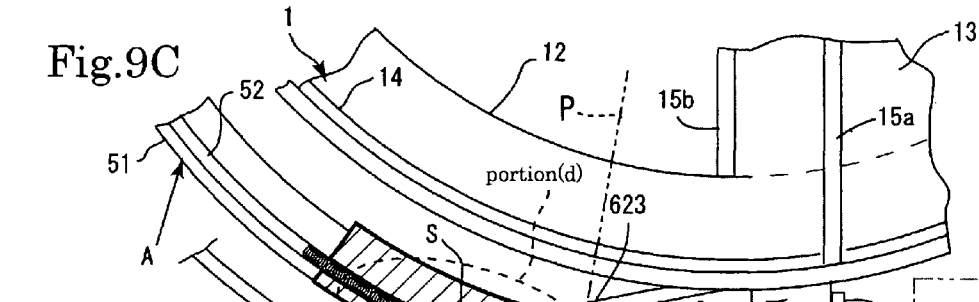
FIG. 9C is a state diagram illustrating a plurality of springs which are jammed as the result of the jamming of the defective spring.
Figure 9D:
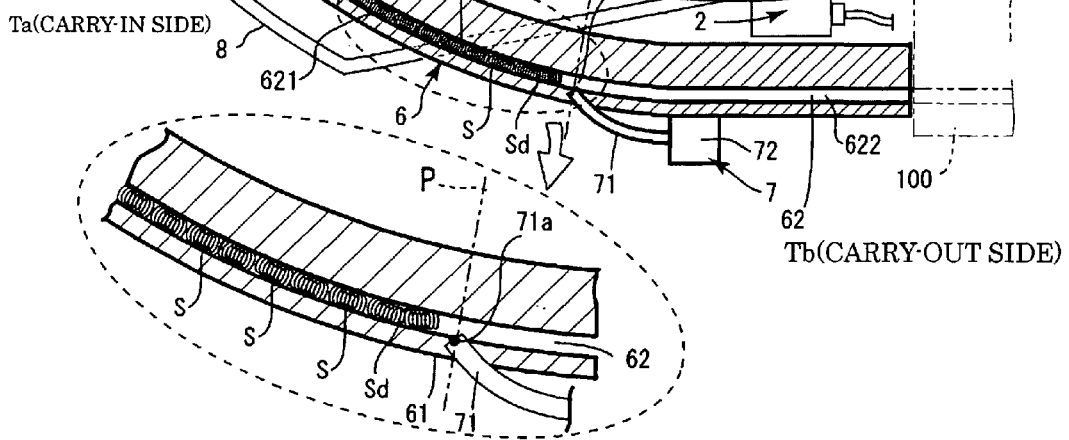
FIG. 9D is an enlarged view of the portion (d) in FIG. 9C.

A process of removing the jamming inside the conveying groove 62 for connection will be explained below. First, as shown in FIG. 8A, the normal spring S is smoothly conveyed in the normal state. Where the defective spring Sd that has not been removed by the first sorting and conveying unit 4 and the second sorting and conveying unit 5 of the conveying path A for feeding enters the conveying groove 62 for connection of the conveying portion 6 for connection, as shown in FIGS. 8B and 8C, the defective spring Sd is caught inside the conveying groove 62 for connection. Because the defective spring Sd is caught inside the conveying groove 62 for connection and the conveying is stopped, the subsequent springs S, S, . . . also cannot be conveyed and the path is jammed by a large number of springs (see FIGS. 9A and 9B). Therefore, the conveying of a large number of springs S, S, . . . is stopped (see FIGS. 9C and 9D).

In a state in which a large number of springs S, S, . . . have thus been stopped, the air is ejected from the jet orifice 71a of the ejection nozzle 71 of the ejection portion 7 for spring removal and a large number of springs S, S, . . . that have jammed the inside of the conveying groove 62 for connection are blown off together with the defective spring Sd and removed from the conveying groove 62 for connection. This removal is conducted instantaneously. The ejection of air from the jet orifice 71a of the ejection portion 7 for spring removal is conducted with fixed time intervals. The air ejection direction V from the jet orifice 71a of the ejection nozzle 71 is almost opposite (inverted) to the conveying direction of the springs S, and the springs S that jammed the inside of the conveying groove 62 for connection are blown off together with the defective spring Sd toward the second sorting and conveying unit 5 and the springs S jamming the path are removed.

The internal configuration of the container 1 will be explained below. The conveying path 12 is formed to have a spiral shape from the bottom portion 1a to the upper portion 1b of the container 1 along the inner side surface 11a of the container 1 and has a gradual inclination (see FIGS. 13 and 14). The conveying path 12 is formed from a band-like sheet and has an appropriate angle such that the inner end side (close to the center of the container 1) of the conveying path 12 is inclined upward with respect to the inner side surface 11a. The conveying path 12 serves to convey the springs S from the bottom portion 1a of the container 1 to the top of the container 1, and the springs S, S, . . . are moved by vibrations of the container 1 caused by the below-described vibrator 9. Further, the inner conveying groove 14 is formed along the circumferential direction close to the inner side surface 11a of the conveying path 12 (see FIG. 1A). The inner conveying groove 14 can be formed such that several springs S can be accommodated therein and arranged in a row along the conveying direction inside the inner conveying groove 14 (see FIG. 6).

The sorting plate 13 is mounted on the upper portion of the container 1. The sorting plate 13 has an almost semicircular shape in the plan view thereof (see FIG. 1A) and is inclined so that the central zone thereof has the largest height and the height decreases toward the outer peripheral edge of the circuit (see FIG. 15). In other words, the sorting plate 13 has an almost flat conical shape that is cut almost in half with reference to a straight line passing through the central portion thereof. In the flat view thereof, the sorting plate has a semicircular shape. In the upper portion location of the container 1, a portion other than the portion covered by the sorting plate 13 is called a return opening 1c. The return opening 1c has an almost semicircular shape.

The sorting plate 13 and the inner side surface 11a do not intersect at a right angle. Thus, the central side of the sorting plate 13 crosses the inner side surface 11a so as to obtain an upward inclined configuration (see FIG. 15). As a result, the spring S located on the sorting plate 13 moves toward the portion where the sorting plate 13 and the inner side surface 11a intersect, that is, toward the outer circumference of the sorting plate 13. The uppermost position of the conveying path 12 and the zone of the sorting plate 13 close to the inner side surface 11a are linked continuously to each other. The springs S, S, . . . that move upward along the conveying path 12 are conveyed to the sorting plate 13. An ejection portion 2 for separation is provided as a separation means for separating the tangled springs S, S, . . . in the connection position of the uppermost portion of the conveying path 12 and the sorting plate 13 and at the inner side surface 11a of the container 1.

Figure 16A:
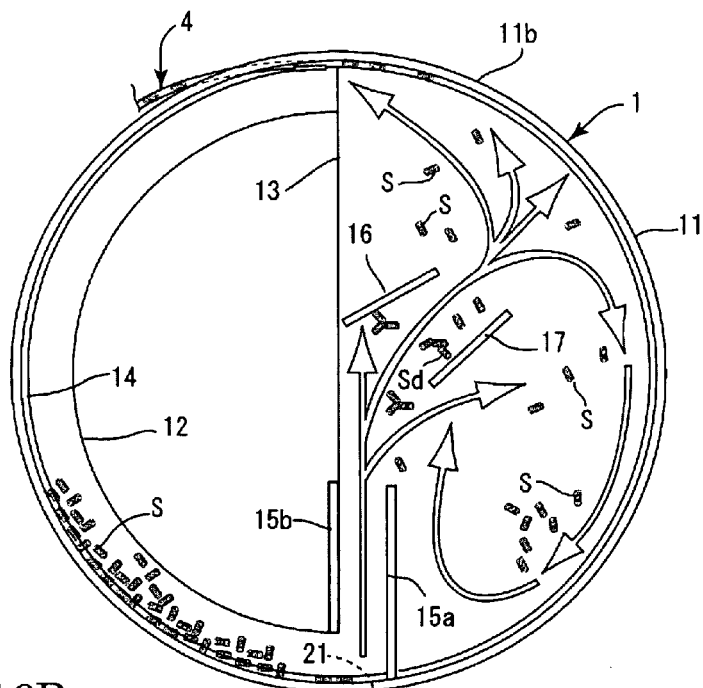
FIG. 16A is an operation diagram illustrating a flow state of the air jet in a case where the air pressure is high.
Figure 16B:
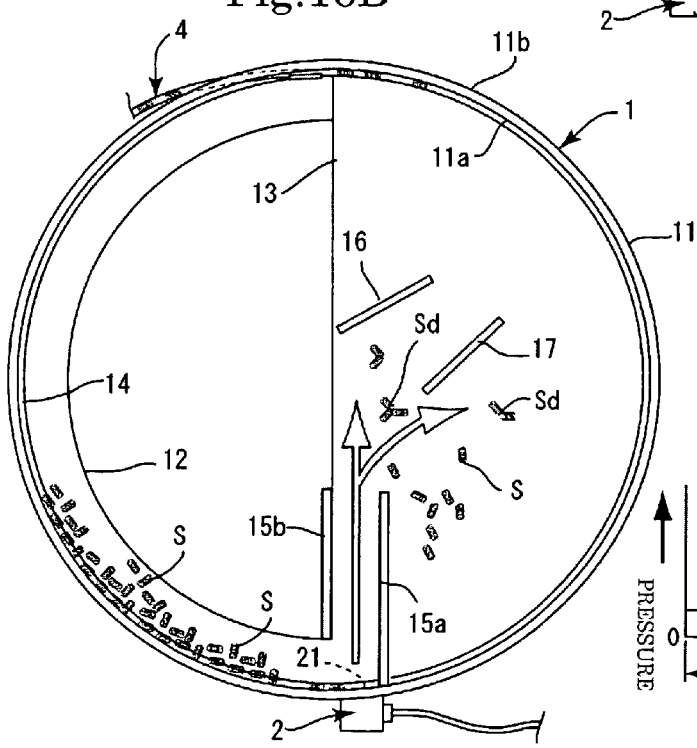
FIG. 16B is an operation diagram illustrating a flow state of the air jet in a case where the air pressure is low.

The ejection portion 2 for separation is constituted by an ejection orifice 21 and an air valve 22. The air valve 22 is mounted on the outer side surface 11b of the container 1 (see FIGS. 14A and 16). The air valve 22 has a configuration in which the air is supplied from an air compressor or the like (not shown in the figure) provided outside the container 1 via a tube 23. The air can be ejected from the ejection orifice 21 of the ejection portion 2 for separation under an ejection pressure that is adjusted to a desired pressure. An air guide wall portion 15 is formed above the sorting plate 13, from the vicinity of the ejection orifice 21 of the ejection portion 2 for separation in the central direction of the sorting plate 13. The air guide wall portion 15 is formed in an almost vertical wall plate shape, and the longitudinal direction thereof is along the direction in which the air is ejected from the ejection orifice 21 of the ejection portion 2 for separation (see FIGS. 13 and 14). The air guide wall portion 15 is constituted by the two opposing plates, namely a main wall plate 15a and an auxiliary wall plate 15b.

The main wall plate 15a is formed to be longer than the auxiliary wall plate 15b and provided along the linear end edge of the sorting plate 13. A predetermined gap is provided between the main wall plate 15a and the inner side surface 11a. A linking portion of the conveying path 12 and the sorting plate 13 is present inside the gap. The gap serves to move and introduce the springs S, S, . . . from the conveying path 12 to the sorting plate 13. The auxiliary wall plate 15b is arranged parallel to the main wall plate 15a. The air jet from the ejection portion 2 for separation flows between the main wall plate 15a and the auxiliary wall plate 15b, and the springs S, S, . . . blown off by the air jet pass through between the main wall plate 15a and the auxiliary wall plate 15b (see FIG. 16).

A fixed wall plate 16 is provided almost in the vicinity of the center of the sorting plate 13 (see FIGS. 13 to 15). More specifically, the fixed wall plate 16 is disposed in a central position of the sorting plate 13 on a side opposite that of the ejection portion 2 for separation, and the fixed plate is inclined at an appropriate inclination angle with respect to the air jet direction. The direction of the air jet from the ejection portion 2 for separation is changed by the inclination angle of the fixed wall plate 16 into the direction toward the sorting plate 13. Further, the springs S, S, . . . blown off by the air jet collide with the fixed wall plate 16, and this collision separates the two or more tangled springs S, S (see FIG. 16A). Further, auxiliary fixed plates 17 that face each other via an appropriate gap are provided at the fixed wall plate 16, and those of the springs S, S, . . . that have collided with the fixed wall plate 16 and have not yet been separated can collide again and be separated.

The vibrator 9 is disposed below the container 1, and the container 1 is vibrated by the vibrator 9. An electromagnetic vibrator 9 is used in this configuration. The vibrations of the container 1 provide appropriate vibrations to the conveying path 12, and the springs S, S, . . . that are stored inside the container can be moved upward of the container 1 along the conveying path 12 and the springs S, S, . . . can be conveyed toward the sorting plate 13. A cover body 19 is detachably attached to the upper portion 1b of the container 1. The cover body 19 is formed from a transparent plate of acryl or glass and fixed to the apex of the container 1 with screw members. A small lid portion (not shown in the figure) is formed at the cover body 19, and a large number of springs S, S, . . . can be introduced into the container 1 by opening the small lid portion.

Figure 16C:
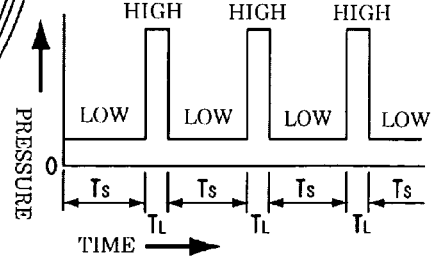
FIG. 16C is a graph illustrating the timer control.

The air jet from the ejection orifice 21 can be operated intermittently by using a timer control. Thus, the interval of actuation and stop of the air jet is timely controlled (see FIG. 16). Thus, the individual separated springs S, S, . . . that were released from the tangled state on the sorting plate 13 can be arranged in a row inside the inner conveying groove 14 and transferred to a next process. FIG. 16C is a graph showing a state in which the intervals of high and low intensity of the air jet is controlled by a timer. In the graph, the intervals of high and low air pressure are plotted against the abscissa, the interval in which the air pressure is high is denoted by TL, and the interval in which the air pressure is low is denoted by TS.

First, the upper lid portion of the cover body 19 is opened, a large number of springs S, S, . . . are placed into the container 1, the vibrator 9 is driven, and appropriate vibrations are provided to the container 1. The springs S, S, . . . stored in the bottom portion of the container 1 are moved along the conveying path 12 and conveyed toward the sorting plate 13. The air jet from the ejection orifice 21 disposed in the connection location of the uppermost position of the conveying path 12 and the sorting plate 13 is normally blown in a state with a low air pressure and the air jet of a high pressure is intermittently blown under the timer control. Under the normally low air pressure obtained under the timer control, the springs S, S, . . . conveyed at the circumference of the ejection orifice 21 are rotated by the air jet and prevented from closing the ejection orifice 21. An air jet of a high air pressure is ejected with a fixed time interval, all the springs S, S, . . . that have collected at the outer circumference of the ejection orifice 21 are blown off toward the fixed wall plate 16, the tangled springs S, S collide with the fixed wall plate 16, and the tangled springs S, S are separated.

When an interval is assumed in which the air pressure of the air jet is again reduced by the intermittent operation, individual springs S, S, . . . are accommodated in the inner conveying groove 14 formed at the outer peripheral edge of the sorting plate 13 and moved toward the through port 18 along the inner conveying groove 14 by the vibrations created by the vibrator 9, the springs S, S, . . . are fed out from the inner conveying groove 14 to the conveying path A provided on the outside of the container 1, and these springs S, S, . . . are conveyed to the spring feeding device provided at the end of the conveying path A for feeding in the conveying direction.

As described hereinabove, an operation of separating the springs S, S in a tangled state is conducted within intervals with a high air pressure by repeating the intervals with high and low air pressure of the air jet. In the interval in which the air pressure is low, individual springs S are conveyed from the inner conveying groove 14 to the conveying path A for feeding. As for the intervals with high and low pressure of the air jet, in accordance with the present invention, the interval with a low air pressure is about 7 sec and the interval with a high air pressure is about 3 sec. However, these values are merely examples and the intervals with high and low air pressure can be appropriately changed by the timer control.

The springs S, S that have been separated from the tangled state by a collision with the fixed wall plate 16 induced by a first jet are returned from the sorting plate 13 again to the bottom portion 1a of the container 1, the springs S, S in the tangled state move again from the conveying path 12 to the sorting plate 13, a similar action of the air jet is repeated, and the tangled springs S, S are separated. The normal spring S is conveyed in a normal state from the inner conveying groove 14 to the conveying groove 42 of the first sorting and conveying unit 4 of the conveying path A for feeding, and the springs S are conveyed to the first sorting and conveying unit 4, second sorting and conveying unit 5, and conveying portion 6 for connection (see FIG. 6).

As described hereinabove, the spring feeder in accordance with the present invention is constituted by the container 1 to which vibrations are appropriately provided, the spiral conveying path 12 formed along the inner side surface of the container 1, the sorting plate 13 that covers part of the location of the upper portion 1b of the container 1 and communicates with the uppermost end of the conveying path 12, the fixed wall plate 16 formed above the sorting plate 13, the ejection orifice 21 that ejects the air jet from the inner side surface the container 1 toward the fixed wall plate 16, the cover body 19 that covers almost the entire surface of the apex of the container 1, and the conveying path A for feeding that is disposed on the outside of the container 1 and conveys the springs S located inside the container 1 to the outside of the container 1, wherein the conveying portion 6 for connection that has the conveying groove 62 is provided in the final end portion of the conveying path A for feeding. The ejection portion 7 for spring removal having the ejection nozzle 71 is attached in the appropriate position of the conveying groove 62, the distal end of the ejection nozzle 71 of the ejection portion 7 for spring removal is brought close to the conveying groove 62 and the ejection direction of the ejection nozzle 71 is almost opposite to the conveying direction of the springs S.

And another example of spring feeder in accordance with the present invention is constituted by a container 1 to which vibrations are appropriately provided; separation means for separating tangled springs S,S; and a conveying path A for feeding springs S, S that is disposed outside the container 1 and conveys the springs S, S inside the container 1 to the outside of the container 1, wherein a conveying portion 6 for connection that has a conveying groove 62 for connection that is formed in a base material for connection is provided in an end portion of the conveying path for feeding, the conveying groove 62 for connection is constituted by an arc-like groove region portion 621 and a straight groove region portion 621, an ejection portion 7 for spring removal that has an ejection nozzle 71 is attached in an appropriate position of the conveying groove 62 for connection, a distal end of the ejection nozzle 71 is provided in the arc-like groove region portion 621, the distal end of the ejection nozzle 71 of the ejection portion 7 for spring removal is brought close to the conveying groove 62 for connection, an ejection direction of the ejection nozzle 71 is substantially opposite to a direction of conveying the springs S, S, a cover member 63 is attached to the base material 61 for connection along the direction of conveying the springs S, S in the conveying groove 62 for connection and covers the groove as far as a position that is slightly beyond a central position of the groove 62 in a widthwise direction thereof, a gap j is provided between the conveying groove 62 for connection and the cover member 63, and the distal end of the ejection nozzle 71 is brought close to the gap j.

What is claimed is:
1. A spring feeder, comprising:
a container to which vibrations are provided;

a conveying path for feeding springs that are disposed outside the container and conveys the springs inside the container to an outside of the container;

a conveying portion comprising a conveying groove for connection which is provided in an end portion of the conveying path for feeding, the conveying groove for connection having a width approximately equal to a width of the springs; and an ejection portion for spring removal comprising an ejection nozzle which is attached at a position of the conveying groove for connection, a distal end of the ejection nozzle of the ejection portion for spring removal being provided close to the conveying groove for connection, the ejection nozzle intermittently generating an air jet for spring removal, wherein an ejection direction of the ejection nozzle is substantially opposite to a direction of conveying the springs, wherein the conveying path for feeding comprises a first sorting and conveying portion and a second sorting and conveying portion, the first sorting and conveying portion, the second sorting and conveying portion, and the conveying portion for connection are linked consecutively from the container side, wherein a width of the conveying groove of the second sorting and conveying portion is narrower than a width of the conveying groove of the first sorting and conveying portion, and wherein said width of the conveying groove of the second sorting and conveying portion is narrow enough to allow only one spring to be loaded in the conveying direction in the conveying groove of the second sorting and conveying portion.

2. The spring feeder according to claim 1, wherein the conveying groove for connection comprises an arc-like groove region portion and a straight groove region portion, and wherein the distal end of the ejection nozzle of the ejection portion for spring removal is provided in the arc-like groove region portion.

3. The spring feeder according to claim 1, wherein the conveying groove for connection comprises an arc-like groove region portion and a straight groove region portion, and wherein the distal end of the ejection nozzle of the ejection portion for spring removal is provided in the straight groove region portion.

4. The spring feeder according to claim 1, wherein the conveying groove for connection comprises an arc-like groove region portion, a straight groove region portion, and a boundary groove region portion, and wherein the distal end of the ejection nozzle of the ejection portion for spring removal is provided in the boundary groove region portion located between the arc-like groove region portion and the straight groove region portion.

5. The spring feeder according to claim 1, wherein the air jet of the ejection portion for spring removal is operated intermittently by a timer control.

6. The spring feeder according to claim 1, further comprising a cover member provided along the direction of conveying the springs in the conveying groove for connection, wherein a gap is defined between the conveying groove for connection and the cover member, and wherein the distal end of the ejection nozzle is brought close to the gap.

7. The spring feeder according to claim 1, wherein a sorting notch portion is formed at one of an end side and an other other end side in a groove widthwise direction in the conveying groove of the first sorting and conveying portion.

8. The spring feeder according to claim 1, further comprising a sorting piece provided in a position close to the conveying groove of the second sorting and conveying portion, and wherein, only when a spring passes through the conveying groove appropriately, the spring does not come into contact with the sorting piece.

9. The spring feeder according to claim 1, wherein the air jet is operated intermittently for an air ejection time which is less than a stop time between air ejection times.

10. A spring feeder configured to feed springs to an outside of the spring feeder, comprising:

a container comprising a circumferential wall;

a conveying path formed on an inner side surface of the circumferential wall, the conveying path having a width approximately equal to a width of a single spring;

a sorting plate formed at an upper portion of the circumferential wall, the sorting plate being formed in communication with the conveying path;

a sorting portion configured to remove defective springs from the conveying path;

an ejection portion for removal of a defective spring, the ejection portion comprising an ejection nozzle configured to intermittently eject an air jet for spring removal, a distal end of the ejection nozzle of the ejection portion for spring removal being provided close to the conveying path after the sorting portion;

a first sorting portion configured to sort defective springs from the conveying path; and a second sorting portion, the first portion and the second portion being linked in consecutive order, the second sorting portion being configured to sort defective springs from the conveying path, wherein a width of a conveying groove of the second sorting portion is less than a width of a conveying groove of the first sorting portion, and wherein an ejection direction of the ejection nozzle is substantially opposite to a direction of conveying the springs.

11. The spring feeder according to claim 1, wherein said conveying groove of the second sorting and conveying portion is configured for small springs having a length of approximately 2 mm to about 15 mm, an outer diameter of about 0.8 mm to about 3 mm, and a wire diameter of about 0.08 mm to about 0.5 mm.

12. The spring feeder according to claim 10, wherein the width of the conveying groove of the second sorting portion is narrow enough to allow only one spring to be loaded therein.

13. The spring feeder according to claim 10, further comprising a vibrator configured to vibrate the container.

14. The spring feeder according to claim 10, wherein the container comprises an approximately flat, cylindrical shape.

15. The spring feeder according to claim 10, wherein the ejection portion is configured to remove defective springs that were not ejected by the sorting portion.

16. The spring feeder according to claim 10, wherein the conveying path, the sorting plate, and said inner side surface of the circumferential wall comprise an inner conveying groove.

17. The spring feeder according to claim 10, further comprising:

a fixed wall plate provided at an approximately center portion of the sorting plate on a side of the sorting plate opposite that of the ejection portion, said fixed plate being inclined at an inclination angle with respect to the air jet direction; and auxiliary fixed plates provided on the sorting plate, said auxiliary fixed plates being configured to face the fixed wall plate.

* * * * *